United States Patent
Ota

(10) Patent No.: US 10,665,160 B2
(45) Date of Patent: May 26, 2020

(54) ELECTROOPTICAL DEVICE, ELECTRONIC APPARATUS, AND DRIVING METHOD OF ELECTROOPTICAL DEVICE

(71) Applicant: SEIKO EPSON CORPORATION, Tokyo (JP)

(72) Inventor: Hitoshi Ota, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 149 days.

(21) Appl. No.: 15/813,763

(22) Filed: Nov. 15, 2017

(65) Prior Publication Data
US 2018/0137820 A1  May 17, 2018

(30) Foreign Application Priority Data
Nov. 15, 2016 (JP) .................... 2016-222559

(51) Int. Cl.
| | |
|---|---|
| *G09G 3/3233* | (2016.01) |
| *G09G 3/3275* | (2016.01) |
| *G09G 3/3266* | (2016.01) |
| *G09G 3/20* | (2006.01) |
| *G03B 33/12* | (2006.01) |

(52) U.S. Cl.
CPC ......... *G09G 3/3233* (2013.01); *G09G 3/2014* (2013.01); *G09G 3/3266* (2013.01); *G09G 3/3275* (2013.01); *G03B 33/12* (2013.01); *G09G 2300/0819* (2013.01); *G09G 2310/08* (2013.01); *G09G 2320/0223* (2013.01); *G09G 2320/0233* (2013.01); *G09G 2320/0247* (2013.01); *G09G 2320/045* (2013.01); *G09G 2320/064* (2013.01); *G09G 2330/021* (2013.01)

(58) Field of Classification Search
CPC .. G09G 3/3233; G09G 3/2014; G09G 3/3275; G09G 3/3266; G09G 2300/0819
See application file for complete search history.

(56) References Cited

U.S. PATENT DOCUMENTS

| | | | |
|---|---|---|---|
| 6,583,775 | B1 | 6/2003 | Sekiya et al. |
| 2003/0063078 | A1 | 4/2003 | Hanari et al. |
| 2004/0150595 | A1 | 8/2004 | Kasai |

(Continued)

FOREIGN PATENT DOCUMENTS

| | | |
|---|---|---|
| JP | 2003-108075 A | 4/2003 |
| JP | 2004-191752 A | 7/2004 |

(Continued)

*Primary Examiner* — Benyam Ketema
(74) *Attorney, Agent, or Firm* — Oliff PLC

(57) ABSTRACT

An electrooptical device includes a plurality of pixels that are disposed corresponding to each of intersection positions at which a plurality of scanning lines and a plurality of data lines intersect with each other, and each of which includes a light emitting element which emits light by a driving current; and a control circuit that performs a control such that the light emitting element emits light or does not emit light. The control circuit causes the light emitting element to transition between a light-emitting state and a non-light-emitting state, in a transition period, in a case where the light emitting element of each pixel corresponding to the unselected scanning line is to transition between a light-emitting state and a non-light-emitting state.

11 Claims, 14 Drawing Sheets

(56) References Cited

U.S. PATENT DOCUMENTS

| | | | |
|---|---|---|---|
| 2004/0196248 A1* | 10/2004 | Sekine | G09G 3/3614 345/100 |
| 2004/0246208 A1 | 12/2004 | Machida | |
| 2005/0041488 A1* | 2/2005 | Ito | G11O 5/063 365/199 |
| 2005/0117384 A1* | 6/2005 | Tsuda | G09G 3/3688 365/152 |
| 2006/0267884 A1 | 11/2006 | Takahashi et al. | |
| 2008/0309599 A1* | 12/2008 | Tsuda | G09G 3/3688 345/88 |
| 2009/0122035 A1* | 5/2009 | Ito | G09G 3/2011 345/204 |
| 2009/0179835 A1* | 7/2009 | Ito | G09G 3/3688 345/76 |
| 2013/0093737 A1* | 4/2013 | Ota | G09G 3/3233 345/204 |
| 2015/0109270 A1* | 4/2015 | Ito | G09G 3/3677 345/207 |
| 2016/0042692 A1 | 2/2016 | Ota et al. | |

FOREIGN PATENT DOCUMENTS

| | | |
|---|---|---|
| JP | 2006-030516 A | 2/2006 |
| JP | 2006-285267 A | 10/2006 |
| JP | 2006-330223 A | 12/2006 |
| JP | 2013-088611 A | 5/2013 |
| JP | 2016-038425 A | 3/2016 |
| WO | 2004-057561 A1 | 7/2004 |

* cited by examiner

ELECTROOPTICAL DEVICE, ELECTRONIC APPARATUS, AND DRIVING METHOD OF ELECTROOPTICAL DEVICE

BACKGROUND

1. Technical Field

The present invention relates to a driving method of an electrooptical device.

2. Related Art

In recent years, various types of electrooptical devices using a light emitting element such as an organic light emitting diode (hereinafter, referred to as an OLED) have been proposed. In a general configuration of the electrooptical device, a pixel circuit including a light emitting element, a transistor, and the like is provided corresponding to each of intersections between scanning lines and data lines such that the pixel circuit corresponds to a pixel of an image to be displayed. As a method of controlling brightness of the electrooptical device with the configuration, there is a technique in which average brightness is adjusted by changing a light-emitting time of the light emitting element.

For example, JP-A-2004-191752 discloses a technique of adjusting the average brightness by repeating cut-off or supply of a driving current according to ON/OFF control of a control transistor provided in a current path of a driving current supplied to the light emitting element during a period from selection to next selection of the pixel, and reducing flickering of a display image by distributing a period during which the pixel does not emit light (black display period).

However, the technique of adjusting the average brightness by changing the light-emitting time of the light emitting element has a problem in that it is difficult to improve display quality of the image in addition to the flickering of the display image. For example, in a case of a large display area, a large number of control transistors are switched to a conduction state at the same timing. As a result, a large potential variation of power supply occurs, and this may affect an operation of the pixel circuit. In particular, when the conduction state of the control transistor is switched during writing of a data voltage, there is a problem in that it is difficult to correctly write the data voltage to the pixel due to affection of the potential variation of the power supply, and this causes display unevenness.

SUMMARY

An advantage of some aspects of the invention is to suppress the affection of the potential variation of the power supply due to light-emitting or non-light-emitting of the light emitting element, and to improve display quality.

According to an aspect of the invention, there is provided an electrooptical device including: a plurality of pixels that are disposed corresponding to each of intersection positions at which a plurality of scanning lines and a plurality of data lines intersect with each other, and each of which includes a light emitting element which emits light by a driving current; and a control circuit that performs a control such that the light emitting element emits light or does not emit light, in which, when a period obtained by excluding, from a horizontal scanning period from selection of one scanning line of the plurality of scanning lines to selection of the next scanning line, an operation period related to data writing into each pixel corresponding to the selected scanning line, is a transition period, in the horizontal scanning period during which the light emitting element emits light, the control circuit controls a ratio between a light-emitting time during which the light emitting element emits light and a non-light-emitting time during which the light emitting element does not emit light, and in a case where the light emitting element of each pixel corresponding to the unselected scanning line is to transition between a light-emitting state and a non-light-emitting state, in the transition period, the control circuit causes the light emitting element to transition between a light-emitting state and a non-light-emitting state.

According to this aspect, during a period for which data writing to the pixels corresponding to one scanning line is performed, a state of the light emitting element is not switched from a light-emitting state to a non-light-emitting state or from a non-light-emitting state to a light-emitting state. Therefore, according to this aspect, even when the potential of the power supply varies due to the state transition of the light emitting element between a light-emitting state and a non-light-emitting state, it is possible to prevent occurrence of a deviation in the data voltage when data writing. Thus, it is possible to suppress occurrence of display unevenness due to the deviation in the data voltage. Therefore, according to this aspect, it is possible to suppress the affection of the potential variation of the power supply due to the light-emitting/non-light-emitting of the light emitting element, and thus it is possible to improve display quality.

In a more preferred aspect, preferably, each of the plurality of pixels includes a switching element provided in a current path of a driving current which is supplied to the light emitting element, the control circuit causes the switching element to transition an ON state in a case where the light emitting element is to emit light and causes the switching element to transition an OFF state in a case where the light emitting element is not to emit light, and the control circuit causes the switching element of each pixel to transition between an ON state and an OFF state in the transition period in a case where the light emitting element of each pixel corresponding to the unselected scanning line is to transition between a light-emitting state and a non-light-emitting state.

According to this aspect, it is possible to control whether to supply the driving current to the light emitting element by controlling ON/OFF of the switching element. Further, the state transition of the switching element is performed only in the transition period. Thus, it is possible to suppress the affection of the potential variation of the power supply due to the light-emitting/non-light-emitting of the light emitting element, and thereby improving display quality.

In the aspect of the above-described electrooptical device, preferably, the control circuit performs switching between a first mode and a second mode according to average brightness of the entire screen, the first mode being a mode in which the switching element transitions to an ON state in the operation period, in which the switching element is switched from an ON state to an OFF state in the transition period, and in which the switching element returns again to an ON state, and the second mode being a mode in which the switching element transitions to an OFF state in the operation period, in which the switching element is switched from an OFF state to an ON state in the transition period, and in which the switching element returns again to an OFF state.

According to this aspect, switching is performed between the first mode in which the switching element transitions to an ON state in the operation period and the second mode in which the switching element transitions to an OFF state in the operation period, according to average brightness of the entire screen. Thus, it is possible to adjust the brightness of the entire screen in a wide range.

In the aspect of the above-described electrooptical device, preferably, the control circuit executes first processing of specifying a horizontal scanning period during which the light emitting element emits light, among a plurality of horizontal scanning periods constituting one frame period, and second processing of specifying a period during which the switching element is in an ON state in the horizontal scanning period specified by the first processing, and in the second processing, the control circuit generates a timing at which the switching element transitions from an OFF state to an ON state and a timing at which the switching element transitions from an ON state to an OFF state during the transition period.

According to this aspect, it is possible to independently adjust the average brightness of the entire screen by each of the first processing and the second processing.

According to another aspect of the invention, there is provided an electrooptical device including: a plurality of pixels that are disposed corresponding to each of intersection positions at which a plurality of scanning lines and a plurality of data lines intersect with each other, and each of which includes a light emitting element which emits light by a driving current and a switching element provided in a current path for supplying the driving current to the light emitting element; and a control circuit that controls a ratio between a light-emitting time during which the light emitting element emits light and a non-light-emitting time during which the light emitting element does not emit light in the horizontal scanning period during which the light emitting element emits light, and that performs a control such that the timings at which the switching element transitions between an ON state and an OFF state are different from each other for each group in which the plurality of pixels are grouped into a plurality of groups in a case where the light emitting element of each pixel corresponding to the unselected scanning line is to transition between a light-emitting state and a non-light-emitting state.

According to this aspect, peaks of the potential variation of the power supply are distributed, as compared with a mode in which the switching elements are switched from an ON state to an OFF state or from an OFF state to an ON state at the same timing. Thus, it is possible to suppress the affection of the potential variation of the power supply and improve display quality. Preferably, in the transition period, the switching element transitions between an ON state and an OFF state.

According to still another aspect of the invention, there is provided an electronic apparatus including the electrooptical device according to any one of the aspects. The electronic apparatus corresponds to a head-mounted display, a projector, or the like.

According to still another aspect of the invention, there is provided a driving method of an electrooptical device including a plurality of pixels that are disposed corresponding to each of intersection positions at which a plurality of scanning lines and a plurality of data lines intersect with each other and each of which includes a light emitting element which emits light by a driving current, the method including: controlling the light emitting element such that the light emitting element emits light or does not emit light; when a period obtained by excluding, from a horizontal scanning period from selection of one scanning line of the plurality of scanning lines to selection of the next scanning line, an operation period related to data writing into each pixel corresponding to the selected scanning line, is a transition period, controlling a ratio between a light-emitting time during which the light emitting element emits light and a non-light-emitting time during which the light emitting element does not emit light, in the horizontal scanning period during which the light emitting element emits light; and causing, in a case where the light emitting element of each pixel corresponding to the unselected scanning line is to transition between a light-emitting state and a non-light-emitting state, the light emitting element of each pixel to transition between a light-emitting state and a non-light-emitting state, in the transition period.

According to this aspect, even when the potential of the power supply varies due to the state transition of the light emitting element between a light-emitting state and a non-light-emitting state, it is possible to prevent occurrence of a deviation in the data voltage when data writing. Thus, it is possible to suppress occurrence of display unevenness due to the deviation in the data voltage.

According to still another aspect of the invention, there is provided a driving method of an electrooptical device including a plurality of pixels that are disposed corresponding to each of intersection positions at which a plurality of scanning lines and a plurality of data lines intersect with each other, and each of which includes a light emitting element which emits light by a driving current and a switching element provided in a current path for supplying the driving current to the light emitting element, the method including: controlling a ratio between a light-emitting time during which the light emitting element emits light and a non-light-emitting time during which the light emitting element does not emit light, in a horizontal scanning period during which the light emitting element emits light; and performing a control such that the timings at which the switching element transitions between an ON state and an OFF state are different from each other for each group in which the plurality of pixels are grouped into a plurality of groups in a case where the light emitting element of each pixel corresponding to the unselected scanning line is to transition between a light-emitting state and a non-light-emitting state.

According to this aspect, peaks of the potential variation of the power supply are distributed, as compared with a mode in which the switching elements are switched from an ON state to an OFF state or from an OFF state to an ON state at the same timing. Thus, it is possible to suppress the affection of the potential variation of the power supply and improve display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
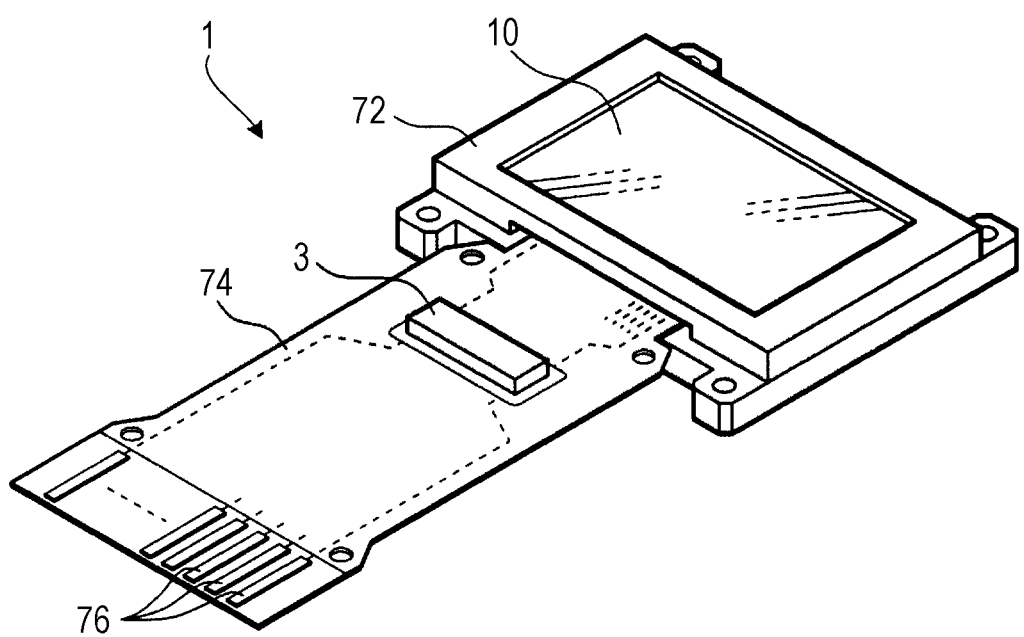
FIG. 1 is a perspective view illustrating a configuration of an electrooptical device according to a first embodiment of the invention.

FIG. 1 is a perspective view illustrating a configuration of an electrooptical device 1 according to a first embodiment of the invention.

The electrooptical device 1 is, for example, a micro display that displays an image on a head-mounted display. Although details of the electrooptical device 1 will be described later, the electrooptical device 1 is an organic EL device in which a plurality of pixel circuits, a driving circuit for driving the pixel circuits, and the like are formed on, for example, a silicon substrate. For the pixel circuit, an OLED which is an example of a light emitting element, is used.

The electrooptical device 1 includes a display panel 10 and a control circuit 3. The display panel 10 is accommodated in a frame-shaped case 72 of which a display portion is opened, and is connected to one end of a flexible printed circuits (FPC) board 74. The control circuit 3 configured with a semiconductor chip is mounted on the FPC board 74 by a chip on film (COF) technology. A plurality of terminals 76 are provided on the FPC board 74, and are connected to a host circuit (not illustrated).

Figure 2:
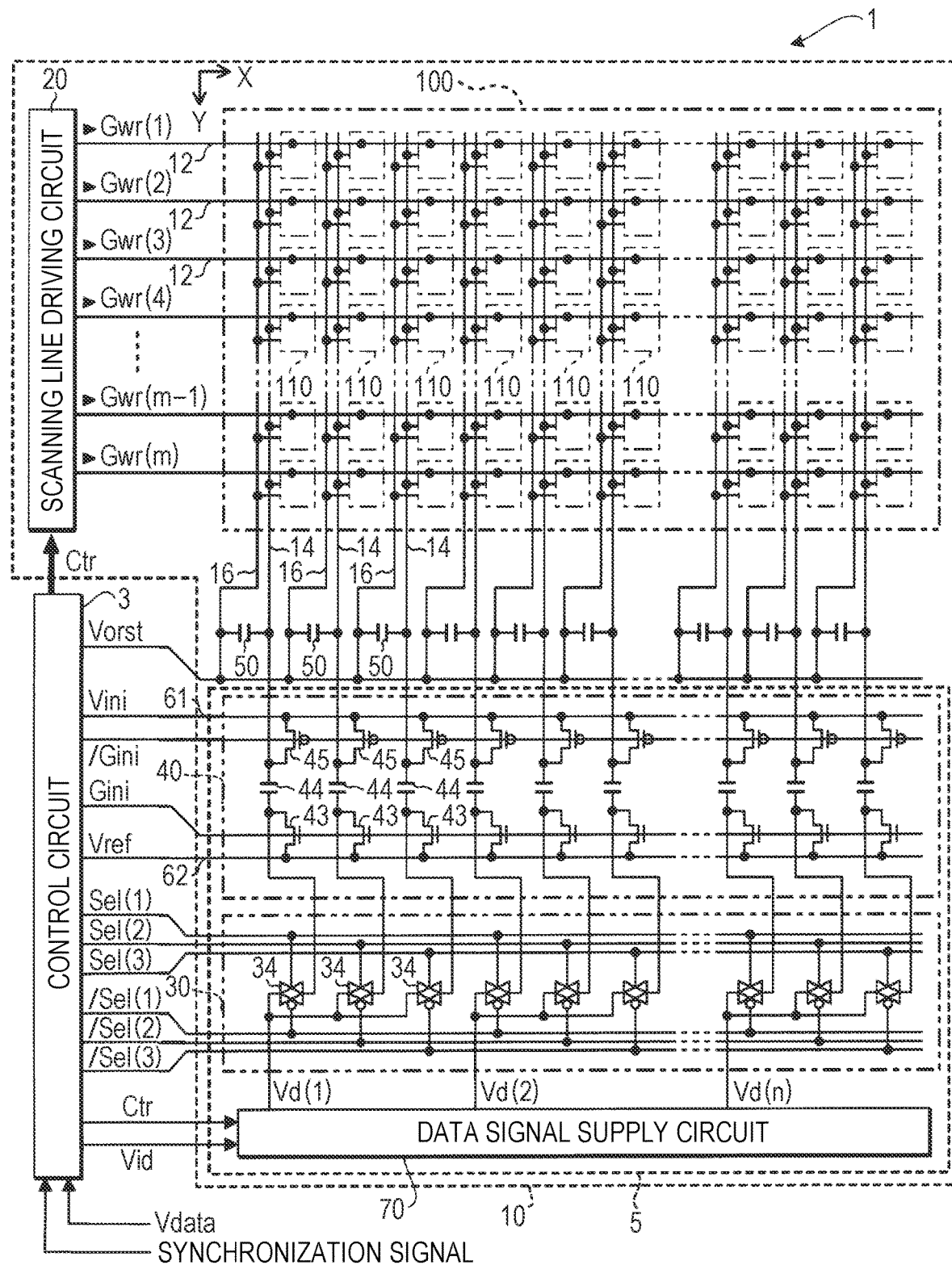
FIG. 2 is a block view illustrating the configuration of the electrooptical device.

FIG. 2 is a diagram illustrating a configuration of the electrooptical device 1 according to the first embodiment. As described above, the electrooptical device 1 includes the display panel 10 and the control circuit 3.

Digital image data Vdata is supplied from the host circuit (not illustrated) to the control circuit 3 in synchronization with a synchronization signal. Here, the image data Vdata is data specifying gradation level of pixels of an image to be displayed on the display panel 10 (strictly speaking, a display unit 100 to be described later) by, for example, eight bits. In addition, the synchronization signal is a signal including a vertical synchronization signal, a horizontal synchronization signal, and a dot clock signal.

The control circuit 3 generates various control signals based on the synchronization signals, and supplies the control signals to the display panel 10. Specifically, the control circuit 3 supplies a control signal Ctr, a positive logic control signal Gini, a negative logic control signal /Gini having a logic inversion relationship with respect to the positive logic control signal Gini, control signals Sel(1), Sel(2), and Sel(3), and control signals /Sel(1), /Sel(2), and /Sel(3) having a logic inversion relationship with respect to the control signals Sel(1), Sel(2), and Sel(3).

Here, the control signal Ctr is a signal including a plurality of signals such as a pulse signal, a clock signal, an enable signal, and the like.

In some cases, the control signals Sel(1), Sel(2) and Sel(3) are collectively referred to as control signals Sel, and the control signals /Sel(1), /Sel(2) and /Sel(3) are collectively referred to as control signals /Sel.

In addition, the control circuit 3 includes a voltage generation circuit. The voltage generation circuit supplies various potentials to the display panel 10. Specifically, the control circuit 3 supplies a potential Vorst, an initial potential Vini, a potential Vref, and the like to the display panel 10.

Further, the control circuit 3 generates an analog image signal Vid based on the image data Vdata. Specifically, the control circuit 3 is provided with a look-up table in which a potential indicated by the image signal Vid and brightness of a light emitting element (OLED 130 to be described later) included in the display panel 10 are stored in correlation with each other. By referring to the look-up table, the control circuit 3 generates the image signal Vid indicating a potential corresponding to the brightness of the light emitting element that is specified by the image data Vdata, and supplies the image signal Vid to the display panel 10.

As illustrated in FIG. 2, the display panel 10 includes a display unit 100 and a driving circuit for driving the display unit 100 (a data transmission line driving circuit 5 and a scanning line driving circuit 20).

Pixel circuits 110 corresponding to the pixels of an image to be displayed are arranged on the display unit 100 in a matrix shape. Specifically, in the display unit 100, m-row scanning lines 12 are provided extending in a horizontal direction in FIG. 2, and (3n)-column data lines 14 grouped in every three columns are provided extending in a vertical direction in FIG. 2. The data lines 14 are provided being electrically insulated from each of the scanning lines 12. The pixel circuits 110 are provided corresponding to intersections between the m-row scanning lines 12 and the (3n)-column data lines 14. Thus, in the present embodiment, the pixel circuits 110 are arranged in a matrix shape with m rows in the vertical direction×(3n) columns in the horizontal direction.

Here, both of m and n are natural numbers. In order to distinguish the rows of the matrix with the scanning lines 12 and the pixel circuits 110, in some cases, the rows are referred to as the first, second, third, . . . , (m−1)-th, and m-th rows in order from the top of FIG. 2. Similarly, in order to distinguish the columns of the matrix with the data lines 14 and the pixel circuits 110, in some cases, the columns are referred to as the first, second, third, . . . , (3n−1)-th, and (3n)-th columns in order from the left of FIG. 2. In addition, in order to explain groups of the data lines 14 in a generalization manner, when an integer j, which is equal to or greater than one and is equal to or less than n, is used, the data lines 14 of the (3j−2)-th column, (3j−1)-th column, and (3j)-th column belonging to the j-th group when counting from the left of FIG. 2.

The three pixel circuits 110, which correspond to the intersections between the scanning line 12 of the same row and the data lines 14 of three columns belonging to the same group, respectively correspond to red (R), green (G), and blue (B) pixels. These three pixels represent one dot of a color image to be displayed. That is, in the present embodiment, a color of one dot is expressed by additive color mixing according to light emission of the OLEDs corresponding to RGB.

In the present embodiment, power supply lines 16 (third power supply lines) are respectively provided along the data lines 14 for each column. The potential Vorst as a potential is commonly supplied to each of the power supply lines 16. In addition, storage capacitors 50 are provided for each column. Specifically, one end of the storage capacitor is connected to the data line 14, and the other end of the storage capacitor is connected to the power supply line 16. Thus, the storage capacitor 50 functions as a second storage capacitor that holds a potential of the data line 14.

Preferably, the storage capacitor 50 is formed by interposing an insulator (a dielectric) between wiring configured with the data line 14 and wiring configured with the power supply line 16.

In addition, although the storage capacitor 50 is provided at the outside of the display unit 100 in FIG. 2, FIG. 2 illustrates only an equivalent circuit. The storage capacitor may be provided at the inside of the display unit 100 or from the inside to the outside of the display unit 100. Further, although not illustrated in FIG. 2, it is assumed that capacitance of the storage capacitor 50 is Cdt.

The data transmission line driving circuit 5 includes a demultiplexer 30, a data transmission circuit 40, and a data signal supply circuit 70. The data signal supply circuit 70 outputs data signals Vd(1), Vd(2), . . . , and Vd(n) to the first, second, . . . , and n-th blocks of the demultiplexer 30 in accordance with a selection timing. In potentials of the data signals Vd(1) to Vd(n), it is assumed that the maximum value of the potentials is Vmax and the minimum value of the potentials is Vmin.

The scanning line driving circuit 20 generates scanning signals for sequentially scanning the scanning lines 12 row by row according to the control signal Ctr during a frame period. Here, the scanning signals supplied to the scanning lines 12 of the first, second, third, . . . , (m−1)-th, and m-th rows are denoted as Gwr(1), Gwr(2), Gwr(3), . . . , Gwr (m−1), and Gwr(m).

In addition to the scanning signals Gwr(1) to Gwr(m), the scanning line driving circuit 20 generates various control signals for each row and supplies the generated control signals to the display unit 100, the control signals being synchronized with the scanning signals (not illustrated in FIG. 2). In addition, one frame period 1F is a period that is required for which the electrooptical device 1 displays an image of one cut (frame). For example, when a frequency of the vertical synchronization signal included in the synchronization signal is 120 Hz, one frame period is a period of 8.3 milliseconds.

The demultiplexer 30 is an array of transmission gates 34 provided for each column, and sequentially supplies data signals to the data lines 14 in a unit of three columns constituting each group.

Here, input ends of the transmission gates 34 corresponding to the (3j−2)-th, (3j−1)-th, and (3j)-th columns belonging to the j-th group are commonly connected to each other, and the data signal Vd(j) is supplied to the common input ends.

When the control signal Sel(1) transitions to an H level (the control signal /Sel(1) transitions to an L level), the transmission gate 34 provided in the (3j−2)-th column which is the leftmost column in the j-th group, transitions to an ON state (a conductive state). Similarly, when the control signal Sel(2) transitions to an H level (the control signal /Sel(2) transitions to an L level), the transmission gate 34 provided in the (3j−1)-th column which is the middle column in the j-th group, transitions to an ON state (a conductive state), and when the control signal Sel(3) transitions to an H level (the control signal /Sel(3) transitions to an L level), the transmission gate 34 provided in the (3j)-th column which is the rightmost column in the j-th group, transitions to an ON state (a conductive state).

The data transmission circuit 40 includes a pair of a storage capacitor 44, a P-channel MOS transistor 45, and an N-channel MOS transistor 43, for each column, and shifts the potentials of the data signals output from output ends of the transmission gates 34 of each column. Here, one end of the storage capacitor 44 is connected to the data line 14 of the corresponding column and a drain node of the transistor 45 of the corresponding column, while the other end of the storage capacitor 44 is connected to the output end of the transmission gate 34 of the corresponding column and a drain node of the transistor 43 of the corresponding column. Thus, the storage capacitor 44 functions as a first storage capacitor of which the one end is connected to the data line 14. Although not illustrated in FIG. 2, it is assumed that capacitance of the storage capacitor 44 is Crf1.

Over the columns, source nodes of the transistors 45 of each column are commonly connected to the power supply line 61 which supplies the potential Vini as the initial potential, and the control signal /Gini is commonly supplied to gate nodes of the transistors 45 of each column. Thus, the transistor 45 electrically connects the data line 14 and the power supply line 61 when the control signal /Gini transitions to an L level, and electrically disconnects the data line 14 and the power supply line 61 when the control signal /Gini transitions to an H level.

In addition, over the columns, source nodes of the transistors 43 of each column are commonly connected to the power supply line 62 which supplies the potential Vref as a predetermined potential, and the control signal Gini is commonly supplied to gate nodes of the transistors 43 of each column. Thus, the transistor 43 electrically connects a node h which corresponds to the other end of the storage capacitor 44 and the power supply line 62 when the control signal Gini transitions to an H level, and electrically disconnects the node h and the power supply line 62 when the control signal Gini transitions to an L level.

In the present embodiment, for convenience, although the scanning line driving circuit 20, the demultiplexer 30, and the data transmission circuit 40 are separately provided, the scanning line driving circuit 20, the demultiplexer 30, and the data transmission circuit 40 may be collectively regarded as a driving circuit for driving the pixel circuit 110.

The pixel circuit 110 will be described with reference to FIG. 3. Since each pixel circuit 110 has the same electrical circuit structure, in this description, the pixel circuit 110 of the i-th row and the (3j−2)-th column which is positioned in the leftmost (3j−2)-th column of the j-th group, will be described as an example.

It is noted that i is a symbol which is generally used to indicate a row in which the pixel circuit 110 is arranged and that i is an integer equal to or greater than one and equal to or less than m.

Figure 3:
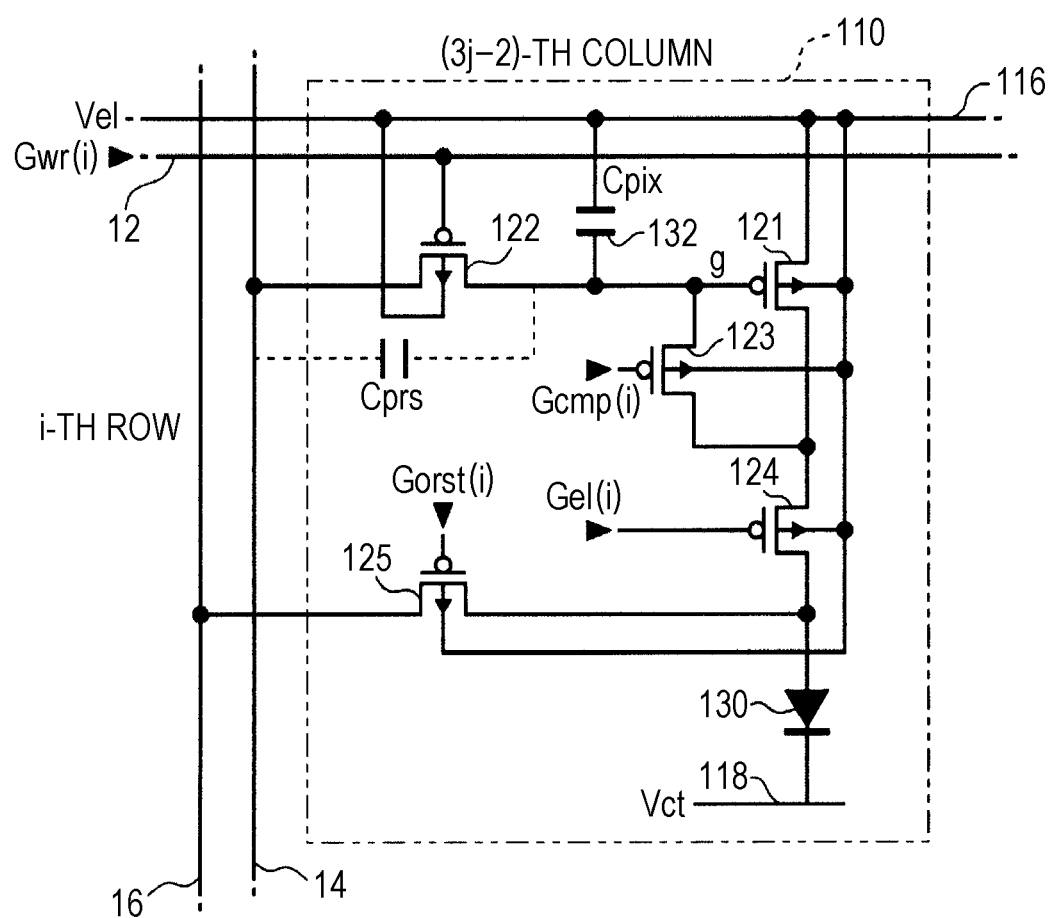
FIG. 3 is a circuit diagram illustrating a configuration of a pixel circuit of the electrooptical device.

As illustrated in FIG. 3, the pixel circuit 110 includes P-channel MOS transistors 121 to 125, an OLED 130, and a storage capacitor 132. The scanning signal Gwr(i) and control signals Gel(i), Gcmp(i), and Gorst(i) are supplied to the pixel circuit 110. Here, the scanning signal Gwr(i) and the control signals Gel(i), Gcmp(i), and Gorst(i) are respectively supplied from the scanning line driving circuit 20, correspondingly to the i-th row. Thus, in the i-th row, the scanning signal Gwr(i) and the control signals Gel(i), Gcmp (i), and Gorst(i) are commonly supplied to the pixel circuits of other columns other than the focused (3j−2)-th column.

In the transistor 122 of the pixel circuit 110 of the i-th row and the (3j−2)-th column, a gate node of the transistor 122 is connected to the i-th row scanning line 12, one node of a drain node and a source node of the transistor 122 is connected to the data line 14 of the (3j−2)-th column, and the other node of the drain node and the source node of the transistor 122 is connected to a gate node g of the transistor 121, one end of the storage capacitor 132, and a drain node of the transistor 123, respectively. Here, the gate node of the transistor 121 is expressed as g in order to distinguish the node from other nodes.

A source node of the transistor 121 is connected to a power supply line 116, and a drain node of the transistor 121 is connected to a source node of the transistor 123 and a source node of the transistor 124, respectively. Here, a potential Vel, which is a high potential of power supply in the pixel circuit 110, is supplied to the power supply line 116.

The control signal Gcmp(i) is supplied to a gate node of the transistor 123.

The control signal Gel(i) is supplied to a gate node of the transistor 124, and a drain node of the transistor 124 is connected to a source node of the transistor 125 and an anode of the OLED 130, respectively. The transistor 124 functions as a switching element provided in a current path of a driving current which is supplied to the OLED 130. In a case where the transistor 124 transitions to an ON state, the OLED 130 emits light, and in a case where the transistor 124 transitions to an OFF state, the OLED 130 does not emit light.

The control signal Gorst(i) corresponding to the i-th row is supplied to a gate node of the transistor 125, and a drain node of the transistor 125 is connected to the power supply line 16 corresponding to the (3j−2)-th column. Thus, the transistor 125 holds the potential Vorst.

The other end of the storage capacitor 132 is connected to the power supply line 116. Thus, the storage capacitor 132 holds a source-drain voltage of the transistor 121. Here, when capacitance of the storage capacitor 132 is denoted by Cpix, the capacitance Cdt of the storage capacitor 50, the capacitance Crf1 of the storage capacitor 44, and the capacitance Cpix of the storage capacitor 132 are set as follows.

$$Cdt > Crf1 \gg Cpix$$

That is, Cdt is set to be greater than Crf1, and Cpix is set to be sufficiently less than Cdt and Crf1.

As the storage capacitor 132, a parasitic capacitor which is provided at the gate node g of the transistor 121, may be used, or a capacitor which is formed by interposing an insulating layer between different conductive layers on a silicon substrate, may be used.

In the present embodiment, since the electrooptical device 1 is formed on a silicon substrate, potentials of the transistors 121 to 125 on the substrate are set to the potential Vel.

The anode of the OLED 130 is a pixel electrode which is individually provided for each pixel circuit 110. On the other hand, a cathode of the OLED 130 is a common electrode 118 which is common to all of the pixel circuits 110, and holds a potential Vct which is a low potential of the power supply in the pixel circuit 110.

The OLED 130 is an element in which a white organic EL layer is interposed between the anode and the cathode having light transmittance on the silicon substrate. A color filter corresponding to any one of R, G, and B is superimposed on a light emission side (cathode side) of the OLED 130.

In the OLED 130, when a current flows from the anode to the cathode, holes injected from the anode and electrons injected from the cathode are recombined with each other in the organic EL layer, and thus excitons are generated. Thereby, white light is emitted. At this time, the emitted white light passes through the cathode on a side opposite to the silicon substrate (anode), and is colored by the color filter. Thus, the colored white light is visible to an observer.

Operation in First Embodiment

Figure 4:
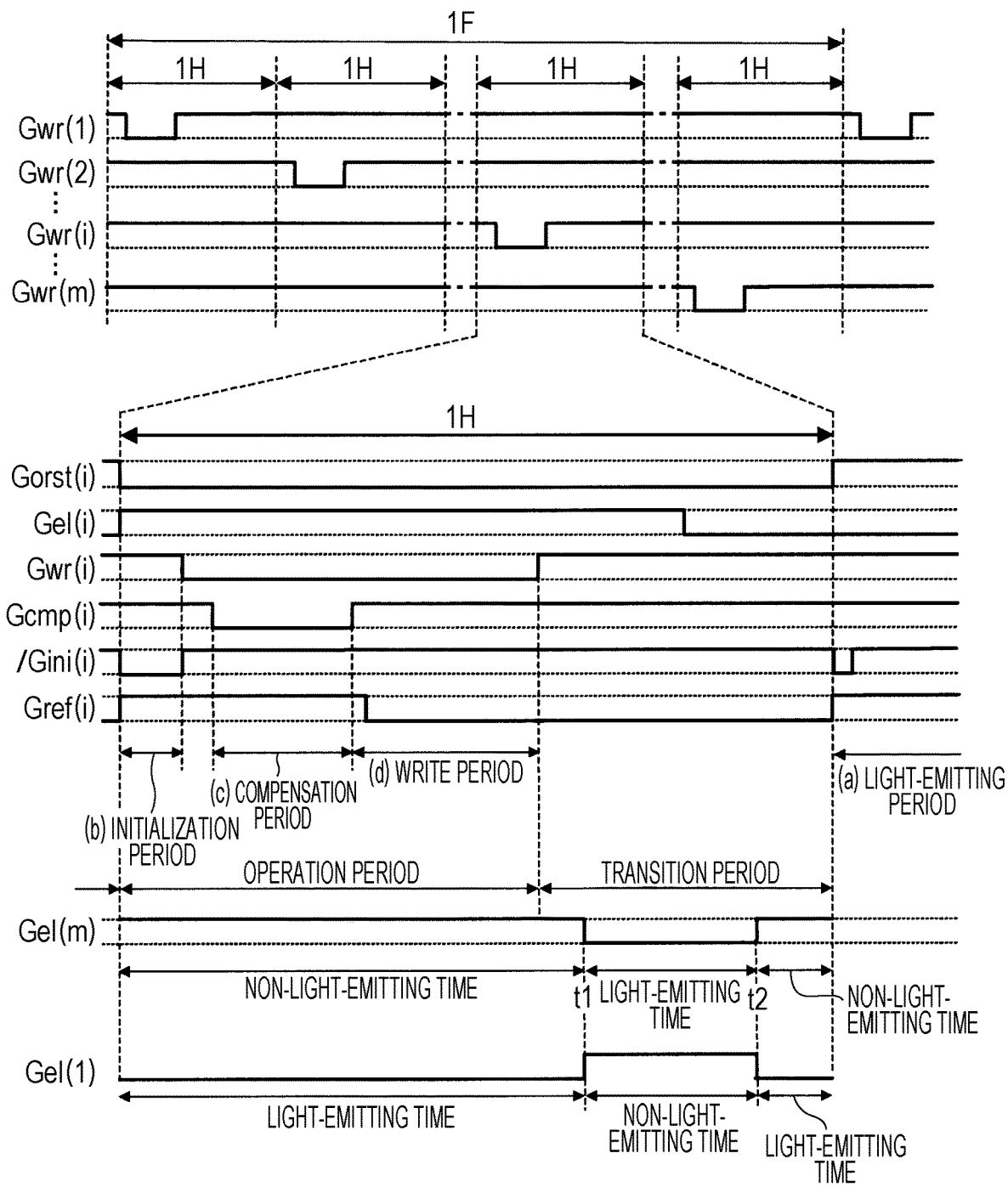
FIG. 4 is a timing chart illustrating an operation of the electrooptical device.

An operation of the electrooptical device 1 will be described with reference to FIG. 4. FIG. 4 is a timing chart for explaining an operation of each unit of the electrooptical device 1.

As illustrated in FIG. 4, the scanning signals Gwr(1) to Gwr(m) are sequentially switched to an L level, and in one frame period 1F, the scanning lines 12 of the first to m-th rows are sequentially scanned for one horizontal scanning period (1H). That is, a period from selection of one scanning line 12 of the plurality of scanning lines 12 to selection of the next scanning line 12 is the horizontal scanning period. In this example, one frame period includes m horizontal scanning periods.

The operation in one horizontal scanning period (1H) is common in the pixel circuits 110 in each row. Thus, in the following description, the operation in one horizontal scanning period during which the i-th row is horizontally scanned will be described, particularly focusing on the pixel circuit 110 of the i-th row and (3j−2)-th column.

In the present embodiment, in FIG. 4, the scanning period of the i-th row is roughly divided into an initialization period indicated by (b), a compensation period indicated by (c), and a write period indicated by (d). After the write period indicated by (d), the light-emitting period indicated by (a) is reached, and after an elapse of one frame period, the scanning period of the i-th row is reached again. Thus, in time order, a cycle of (a light-emitting period)→an initialization period→a compensation period→a write period→(a light-emitting period) is repeated.

Here, a period from the start of the initialization period to the end of the write period is an operation period related to writing of data into the pixel corresponding to the selected scanning line 12. The operation period includes a data writing period and an operation execution period required for writing data. For example, the operation period includes an initialization period, a compensation period, and a write period. One horizontal scanning period (1H) includes an operation period and a transition period. In the present embodiment, in order to adjust brightness of the entire screen, the control circuit 3 performs a control such that the OLED 130 transitions between a light-emitting state and a non-light-emitting state in the transition period.

Light-Emitting Period

For convenience of explanation, the light-emitting period as a precondition of the initialization period will be described. As illustrated in FIG. 4, in the light-emitting period of the i-th row, the scanning signal Gwr(i) is in an H level and the control signal Gel(i) is in an L level. In addition, among the control signals Gel(i), Gcmp(i), and Gorst(i) as logic signals, the control signal Gel(i) is in an L level, and the control signals Gcmp(i) and Gorst(i) are in an H Level.

Figure 5:
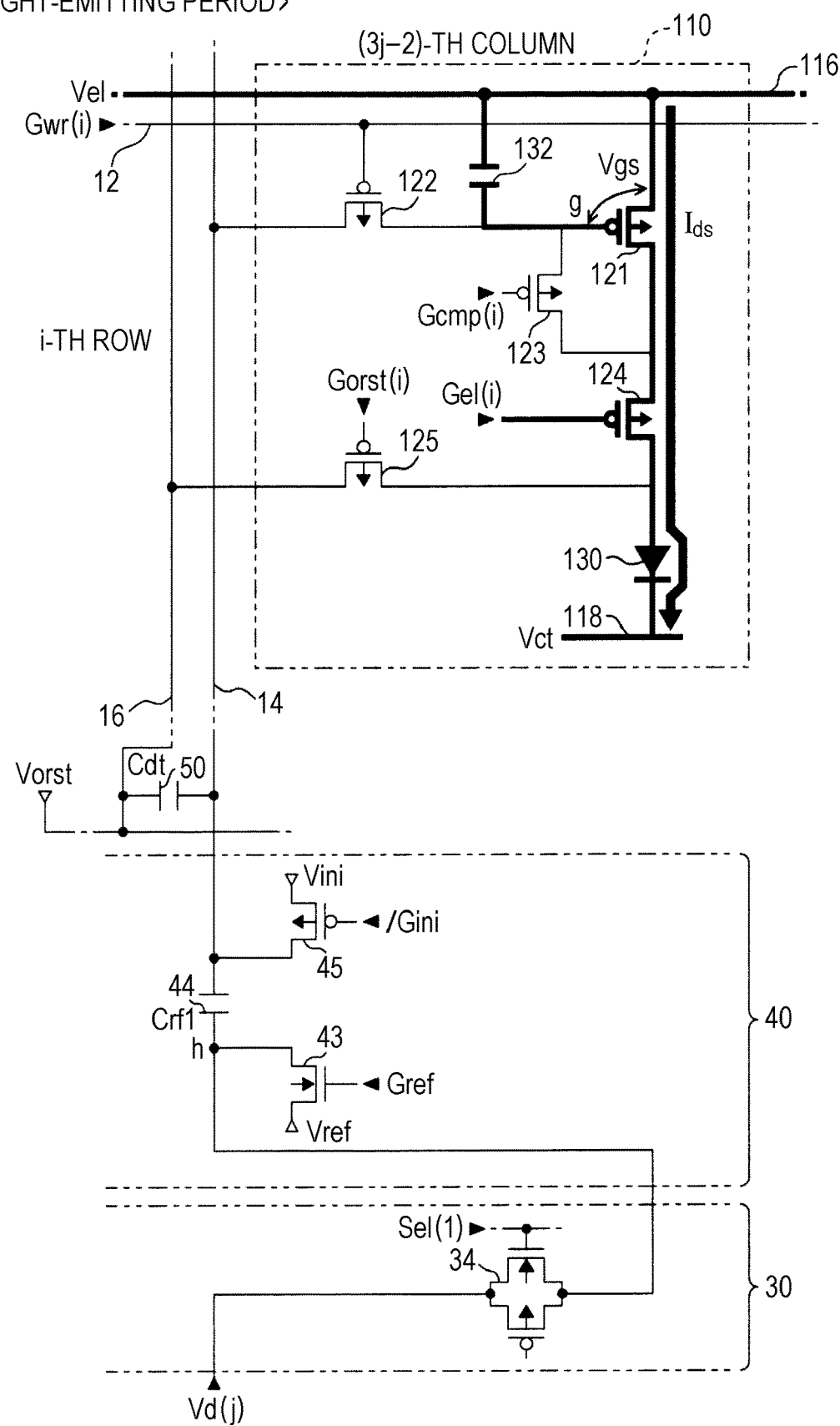
FIG. 5 is a diagram explaining an operation of the electrooptical device.

Thus, as illustrated in FIG. 5, in the pixel circuit 110 of the i-th row and the (3j−2)-th column, the transistor 124 transitions to an ON state, while the transistors 122, 123, and 125 transition to an OFF state. Therefore, the transistor 121 supplies a current $I_{ds}$ corresponding to a gate-source voltage Vgs, to the OLED 130. As will be described later, in the present embodiment, the voltage Vgs in the light-emitting period is a voltage of which the level is shifted from a threshold voltage of the transistor 121 by the potential of the data signal. Thus, the current corresponding to the gradation level is supplied to the OLED 130 in a state where the threshold voltage of the transistor 121 is compensated.

Since the light-emitting period of the i-th row is a period during which another row other than the i-th row is horizontally scanned, the potential of the data line 14 appropriately varies. On the other hand, in the pixel circuit 110 of the i-th row, since the transistor 122 is in an OFF state, the potential variation of the data line 14 is not considered in here.

Figure 6:
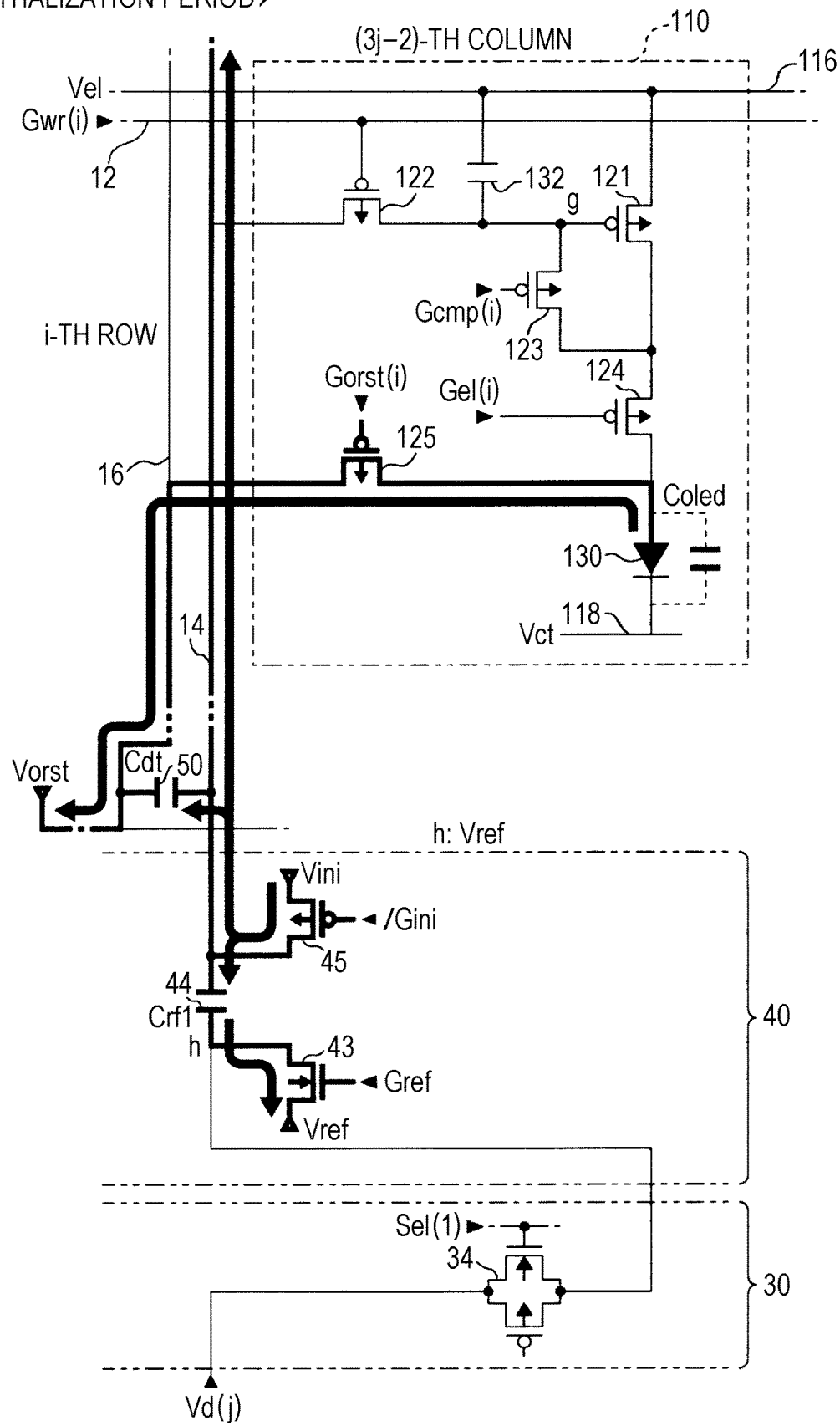
FIG. 6 is a diagram explaining an operation of the electrooptical device.
Figure 7:
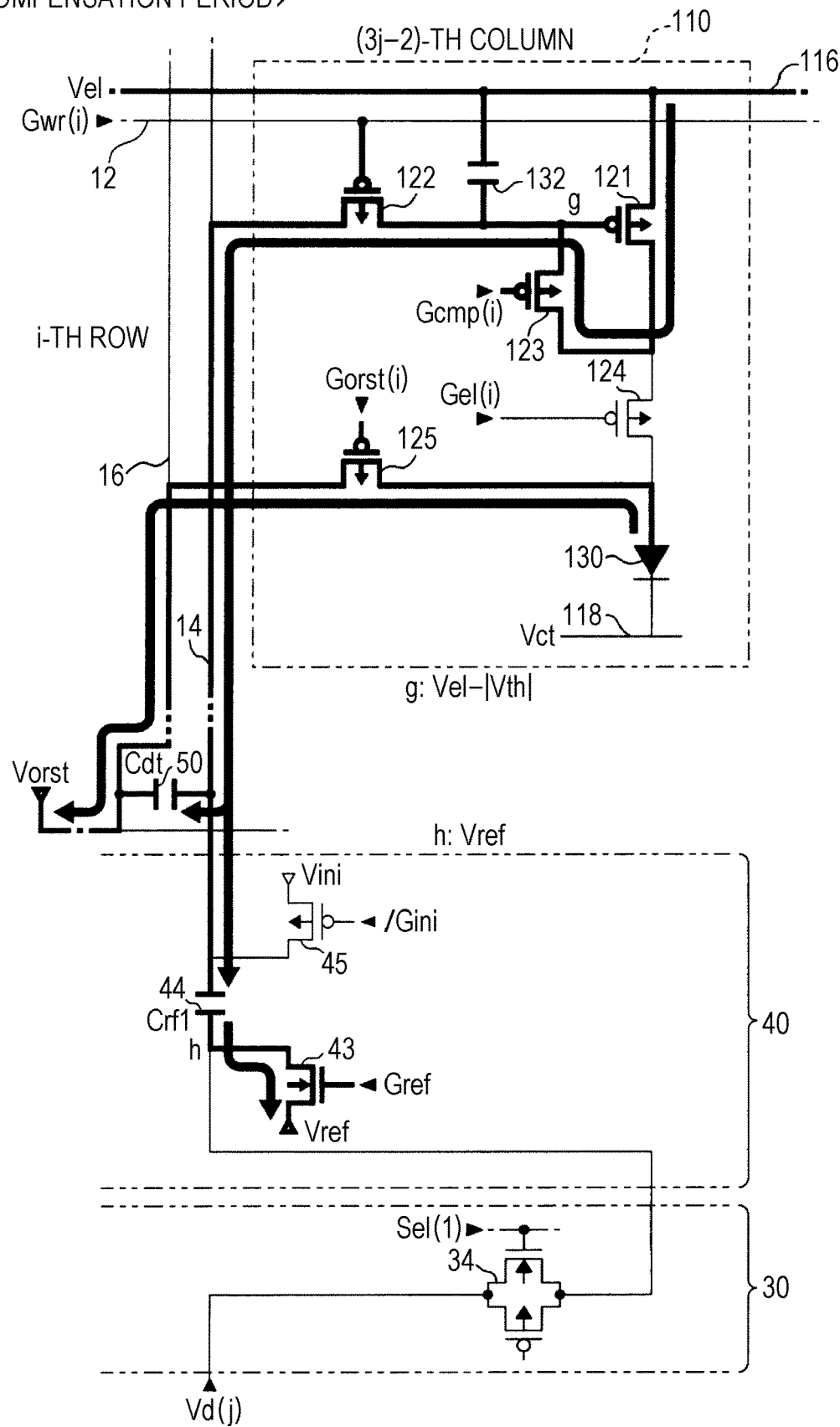
FIG. 7 is a diagram explaining an operation of the electrooptical device.
Figure 8:
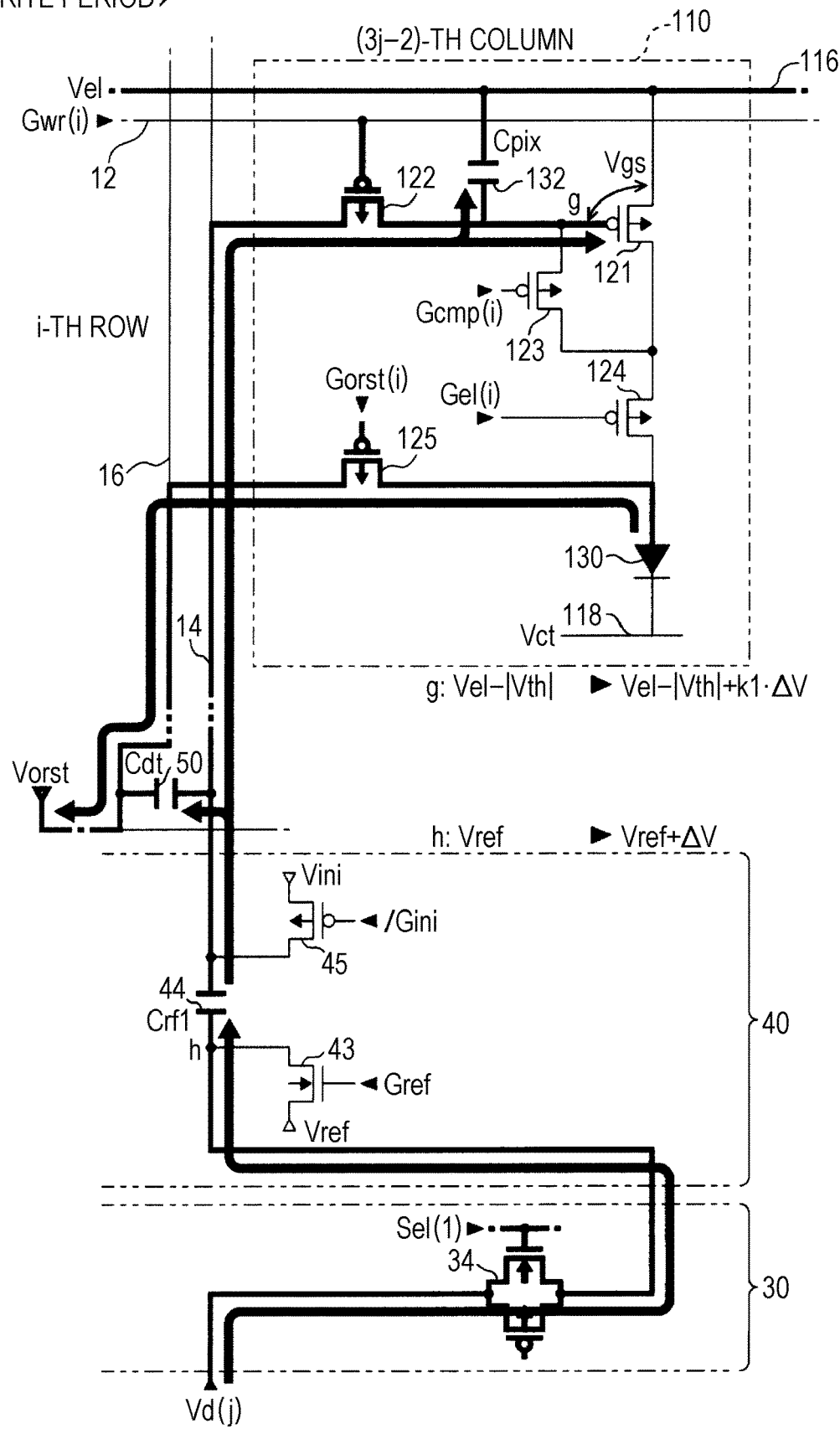
FIG. 8 is a diagram explaining an operation of the electrooptical device.

In addition, in FIG. 5, paths which are important in explanation of the operation are indicated by bold lines (this also applies to the following FIGS. 6 to 8).

Initialization Period

Next, when the horizontal scanning period of the i-th row is reached, first, the initialization period indicated by (b) is started. In the initialization period, as compared with the light-emitting period, the control signal Gel(i) transitions to an H level and the control signal Gorst(i) transitions to an L level.

Thus, as illustrated in FIG. 6, in the pixel circuit 110 of the i-th row and the (3j−2)-th column, the transistor 124 transitions to an OFF state, and the transistor 125 transitions to an ON state. Therefore, a path of the current supplied to the OLED 130 is cut-off, and the anode of the OLED 130 is reset to the potential Vorst.

Since the OLED 130 has a configuration in which the organic EL layer is interposed between the anode and the cathode as described above, as illustrated by a broken line of FIG. 6, parasitic capacitance Coled is present between the anode and the cathode. When a current flows through the OLED 130 in the light-emitting period, a voltage between both ends of the anode and the cathode of the OLED 130 is held by the capacitance Coled. On the other hand, the held voltage is reset, as the transistor 125 transitions to an ON state. Thus, in the present embodiment, when a current flows again through the OLED 130 in the subsequent light-emitting period, the current is not likely to be affected by the voltage which is held by the capacitance Coled.

Specifically, for example, in a configuration in which the held voltage is not reset when switching from a high brightness display state to a low brightness display state, since a high voltage when brightness is high (when large current flows) is held, thereafter, even when a small current is intended to flow, an excessive current flows. As a result, a low brightness display state cannot be achieved. In contrast, in the present embodiment, as the transistor 125 transitions to an ON state, the potential of the anode of the OLED 130 is reset. Thus, reproducibility at low brightness is enhanced.

In the present embodiment, the potential Vorst is set such that a difference between the potential Vorst and the potential Vct of the common electrode 118 is lower than a light-emitting threshold voltage of the OLED 130. Thus, in the initialization period (the compensation period and the write period to be described later), the OLED 130 is in an OFF (non-light-emitting) state.

On the other hand, in the initialization period, the control signal /Gini is in an L level, and the control signal Gref is in an H level. Thus, as illustrated in FIG. 6, in the data transmission circuit 40, the transistors 45 and 43 transition to an ON state, respectively. Therefore, a potential of the data line 14 which corresponds to one end of the storage capacitor 44, is initialized to the potential Vini, and a potential of the node h which corresponds to the other end of the storage capacitor 44, is initialized to the potential Vref, respectively.

In the present embodiment, the potential Vini is set such that (Vel-Vini) is greater than the threshold voltage |Vth| of the transistor 121. Since the transistor 121 is a P-channel transistor, the threshold voltage Vth of the transistor 121 is negative with respect to a potential of the source node of the transistor 121. For this reason, in order to prevent confusion in a potential level explanation, the threshold voltage is represented by |Vth| as an absolute value, and is defined by a magnitude thereof.

In addition, in the present embodiment, the potential Vref is set such that the potential of the node h is changed to be higher in the subsequent write period with respect to the potentials of the data signals Vd(1) to Vd(n). For example, the potential Vref is set to be lower than the minimum value Vmin of the potentials of the data signals Vd(1) to Vd(n).

Compensation Period

In the horizontal scanning period of the i-th row, next, the compensation period indicated by (c) is reached. In the compensation period, the scanning signal Gwr(i) and the control signal Gcmp(i) transition to an L level, as compared with the initialization period. On the other hand, in the compensation period, the control signal /Gini transitions to an H level in a state where the control signal Gref is maintained at an H level.

Thus, as illustrated in FIG. 7, in the data transmission circuit 40, in a state where the transistor 43 is in an ON state, the transistor 45 transitions to an OFF state. Thus, the potential of the node h is fixed to the potential Vref. On the other hand, in the pixel circuit 110 of the i-th row and (3j−2)-th column, as the transistor 122 transitions to an ON state, the gate node g is electrically connected to the data line 14. Thus, at the beginning of the compensation period, a potential of the gate node g is set to the potential Vini.

In the compensation period, the transistor 123 transitions to an ON state, and thus the transistor 121 is diode-connected. As a result, a drain current flows through the transistor 121, and thus the gate node g and the data line 14 are charged by the drain current. Specifically, the current flows through a path of the power supply line 116→the transistor 121→the transistor 123→the transistor 122→the data line 14 of the (3j−2)-th column. As a result, the transistor 121 transitions to an ON state, and thus the data line 14 and the gate node g are connected to each other. Therefore, the potentials of the data line 14 and the gate node g increase from the potential Vini.

On the other hand, as the potential of the gate node g reaches a potential (Vel−|Vth|), the current flowing through the path is not likely to flow. Thus, until the end of the compensation period, the potentials of the data line 14 and the gate node g are saturated at the potential (Vel-|Vth|). Therefore, the storage capacitor 132 holds the threshold voltage |Vth| of the transistor 121 until the end of the compensation period.

Write Period

After the initialization period, the write period indicated by (d) is reached. In the write period, the control signal Gcmp(i) transitions to an H level, and thus the diode-connection of the transistor 121 is released. On the other hand, the control signal Gref transitions to an L level, and thus the transistor 43 transitions to an OFF state. Therefore, although a path from the data line 14 of the (3j−2)-th column to the gate node g in the pixel circuit 110 of the i-th row and the (3j−2)-th column is in a floating state, the potential in the path is held to (Vel-|Vth|) by the storage capacitors 50 and 132.

In the write period of the i-th row, in a case of the j-th group, the control circuit 3 sequentially switches the data signal Vd(j) to potentials corresponding to the gradation level of the pixels of the i-th row and the (3j−2)-th column, the i-th row and the (3j−1)-th column, and the i-th row and the (3j)-th column. On the other hand, the control circuit 3 performs a control such that the control signals Sel(1), Sel(2), and Sel(3) sequentially and exclusively transition to an H level in synchronization with the switching of the data signal to the potential. Although not illustrated in FIG. 4, the control circuit 3 also outputs the control signals /Sel(1), /Sel(2), and /Sel(3) having a logic inversion relationship with respect to the control signals Sel(1), Sel(2), and Sel(3). Thus, in the demultiplexer 30, the transmission gates 34 in each group transition to an ON state in order of the leftmost column, the center column, and the rightmost column.

Here, when the transmission gate 34 of the leftmost column transitions to an ON state by the control signals Sel(1) and /Sel(1), as illustrated in FIG. 8, the potential of the node h, which is the other end of the storage capacitor 44, changes from the potential Vref which is fixed in the initialization period and the compensation period, to the potential of the data signal Vd(j), that is, the potential corresponding to the gradation level of the pixel of the i-th row and the (3j−2)-th column. It is assumed that a potential change amount of the node h at this time is represented by ΔV and the changed potential is represented by (Vref+ΔV).

On the other hand, the gate node g is connected to one end of the storage capacitor 44 via the data line 14. Thus, the potential of the gate node g has a value (Vel-|Vth|+k1·ΔV), which is obtained by shifting the potential in the compensation period (Vel-|Vth|) in an increase direction by a value obtained by multiplying the potential change amount ΔV of the node h and a capacitance ratio k1. At this time, when representing the potential of the gate node g by using an absolute value, the voltage Vgs of the transistor 121 is represented by a value (|Vth|-k1·ΔV) which is obtained by subtracting the shifted increase amount of the potential of the gate node g from the threshold voltage |Vth|.

It is noted that the capacitance ratio k1 is Crf1/(Cdt+ Crf1). Strictly speaking, although the capacitance Cpix of the storage capacitor 132 needs to be considered, since the capacitance Cpix is set to be sufficiently lower than the capacitance Crf1 and the capacitance Cdt, the capacitance Cpix may be neglected.

After the end of the write period of the i-th row, when one horizontal scanning period ends, the light-emitting period is reached. In the light-emitting period, as described above, the control signal Gel(i) transitions to an L level. Thus, in the pixel circuit 110 of the i-th row and the (3j−2)-th column, the transistor 124 transitions to an ON state. Since the gate-source voltage Vgs is (|Vth|-k1·ΔV), as illustrated in FIG. 5, the current corresponding to the gradation level is supplied to the OLED 130 in a state where the threshold voltage of the transistor 121 is compensated.

In the scanning period of the i-th row, the operation is executed in parallel and simultaneously in the other pixel circuits 110 of the i-th row, in addition to the pixel circuit 110 of the i-th row and the (3j−2)-th column. Further, the operation for the i-th row is actually executed in order of the first, second, third, . . . , (m−1)-th, and m-th rows in one frame period, and is repeated for each frame.

According to the present embodiment, since a potential range ΔVgate of the gate node g is narrow with respect to a potential range ΔVdata of the data signal, even when the data signal is not divided for fine precision, the voltage in which the gradation level is reflected can be applied between the gate and the source of the transistor 121. Thus, even in a case where a change in the minute current flowing through the OLED 130 is relatively greater than a change in the gate-source voltage Vgs of the transistor 121 in the fine pixel circuit 110, it is possible to control the current supplied to the OLED 130 with high precision.

In addition, as illustrated by a broken line in FIG. 3, parasitic capacitance Cprs is actually present between the data line 14 and the gate node g of the pixel circuit 110. For this reason, when a change range of the potential of the data line 14 is wide, the change of the potential of the data line 14 is propagated to the gate node g via the capacitance Cprs. As a result, so-called crosstalk, unevenness, or the like occurs, and this causes deterioration in display quality. When the pixel circuit 110 is miniaturized, the affection of the capacitance Cprs appears remarkably.

On the other hand, in the present embodiment, the change range of the potential of the data line 14 is also narrower than the potential range ΔVdata of the data signal, and thus the affection of the propagation via the capacitance Cprs can be suppressed.

Control of Brightness of Entire Screen

Next, control of average brightness of the entire screen of the electrooptical device 1 will be described. In the electrooptical device 1 according to the present embodiment, in the period from selection of the scanning line 12 of the i-th row to next selection of the scanning line 12 of the i-th row, average brightness of the entire screen can be adjusted by duty control of repeating ON/OFF of the transistor 124 provided in the current path of the driving current $I_{ds}$, which is supplied to the light emitting element (OLED 130) of the pixel circuit 110 connected to the scanning line 12 of the i-th row.

Figure 9:
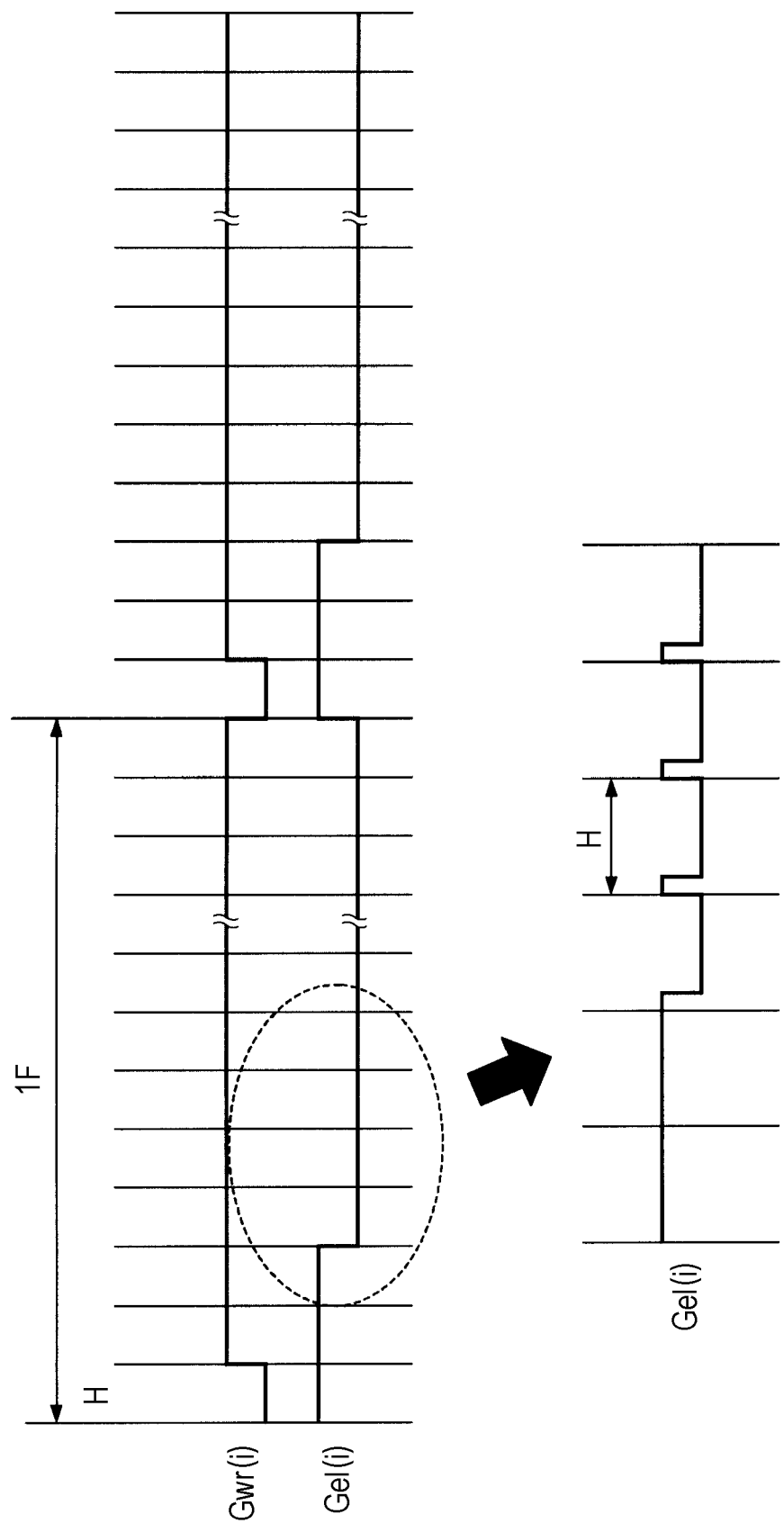
FIG. 9 is a diagram explaining duty control for brightness control of the electrooptical device.

FIG. 9 is a diagram explaining the duty control for the pixel circuits 110 of the i-th row, and the scanning signal Gwr(i) and the control signal Gel(i) are schematically illustrated in FIG. 9. The duty control is realized by using the control signal Gel(i) with a comb-shaped waveform, and controlling a length of the period during which the control signal Gel(i) is in an active state (L level) as illustrated in FIG. 11.

Figure 10:
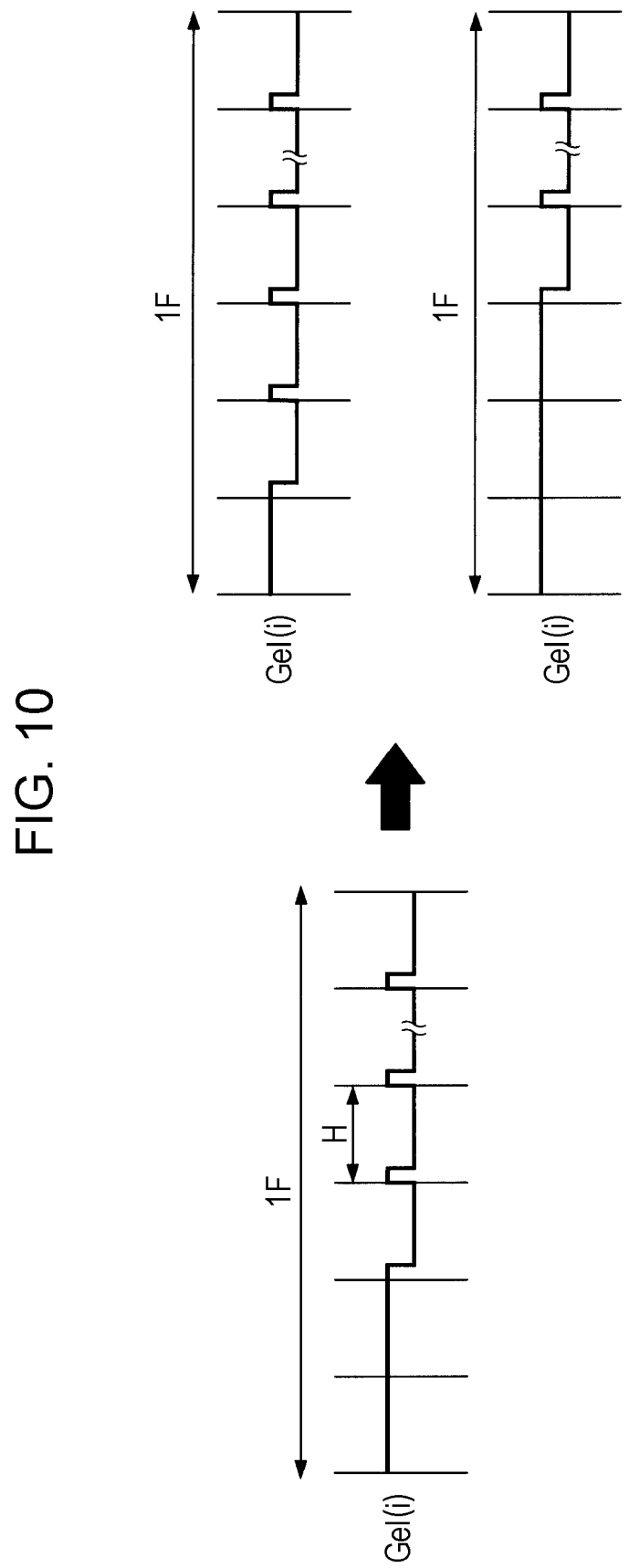
FIG. 10 is a diagram explaining V synchronization duty control.

As adjustment modes of the average brightness by the duty control, there are two modes of V synchronization duty control and H synchronization duty control. FIG. 10 is a diagram explaining V synchronization duty control for the i-th row, and FIG. 11 is a diagram explaining H synchronization duty control for the i-th row. As illustrated in FIG. 10, the V synchronization duty control is a mode of adjusting the average brightness of the pixel circuits 110 of the i-th row by increasing or decreasing the number of ON pulses of the control signal Gel(i) in one frame period from selection of the i-th row to next selection of the i-th row. In the left of FIG. 10, the control signal Gel(i) in a state before adjustment is illustrated. In a case where it is desired to make the average brightness brighter than the state before adjustment, as illustrated in the upper right of FIG. 10, the control circuit 3 performs a control so as to increase the number of the pulses of the control signal Gel(i). On the other hand, in a case where it is desired to make the average brightness darker than the state before adjustment, as illustrated in the lower right of FIG. 10, the control circuit 3 performs a control so as to decrease the number of the pulses of the control signal Gel(i). As described above, since the V synchronization duty control is a mode of adjusting the average brightness by using the number of the pulses in one frame period, adjustment performance depends on the number of the scanning lines 12. For example, in a case where the number of the scanning lines 12 is 720, the minimum number of the pulses is one, and the maximum number of the pulses is 720. Thus, an average brightness adjustment range and resolution are determined by the minimum number and the maximum number of the pulses.

Figure 11:
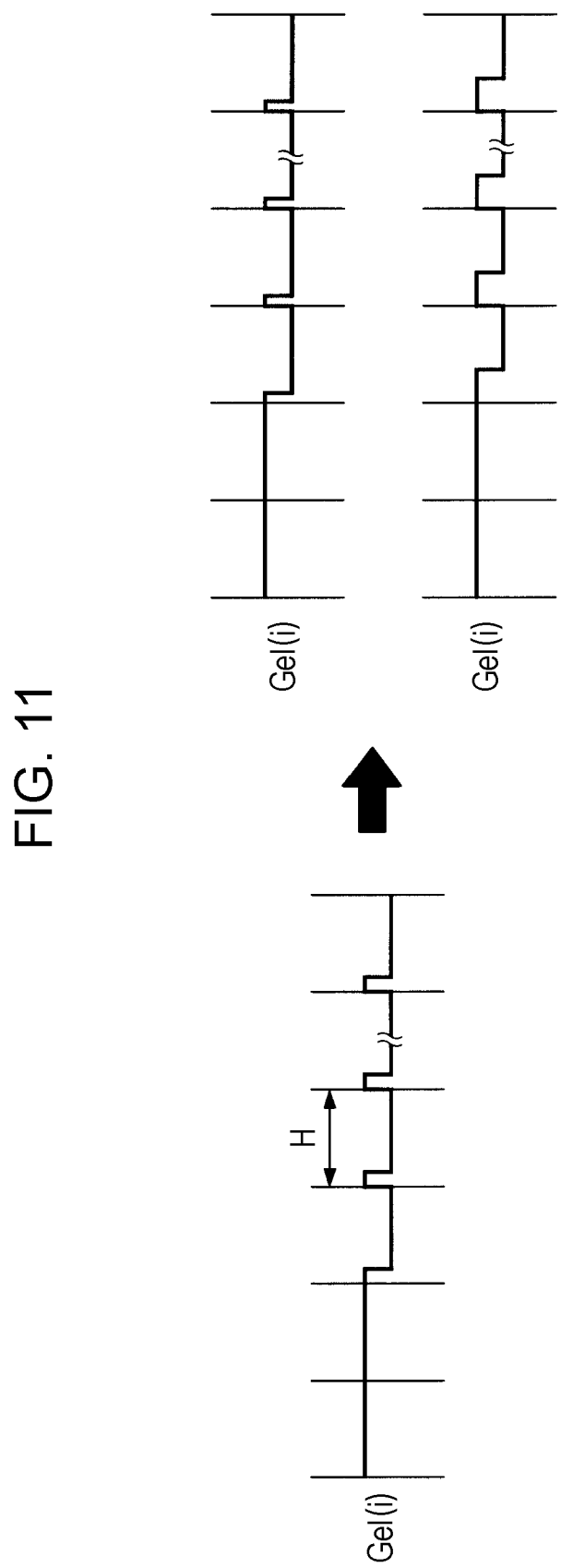
FIG. 11 is a diagram explaining H synchronization duty control.

On the other hand, as illustrated in FIG. 11, the H synchronization duty control is a mode of adjusting the average brightness of the pixel circuits 110 by increasing or decreasing a width of the on-pulse of the control signal Gel(i) in one horizontal scanning period (1H). In the left of FIG. 11, the control signal Gel(i) in a state before adjustment is illustrated. In a case where it is desired to make the average brightness brighter than the state before adjustment, as illustrated in the lower right of FIG. 11, the control circuit 3 performs a control so as to increase the width of the pulse of the control signal Gel(i). On the other hand, in a case where it is desired to make the average brightness darker than the state before adjustment, as illustrated in the upper right of FIG. 11, the control circuit 3 performs a control so as to decrease the width of the pulse of the control signal Gel(i). Since the H synchronization duty control is a mode of adjusting the average brightness by using the width of the pulse in one horizontal scanning period (1H), an average brightness adjustment range and resolution are determined by a frequency of a clock signal which generates the pulse.

On the other hand, in the H synchronization duty control, during one horizontal scanning period, the OLED 130 is switched from a light-emitting state to a non-light-emitting state or from a non-light-emitting state to a light-emitting state. As a result, there is a case where the transistors 124 of each pixel circuit 110 transition from an OFF state to an ON state at the same time. In this case, a large current flows through the power supply line 116, and the potential Vel of the power supply varies. When the potential of the power supply varies during the operation period, it is difficult to accurately write the data voltage to the pixel circuit 110, and this causes display unevenness and deterioration in display quality.

Therefore, in the present embodiment, in a case where the OLED 130 transitions between a light-emitting state and a non-light-emitting state, the state transition of the OLED 130 is performed in the transition period illustrated in FIG. 4. In the example illustrated in FIG. 4, the scanning line 12 of the i-th row is selected. At this time, in the pixel circuits 110 corresponding to the scanning line 12 of the m-th row (unselected), the transistors 124 are switched from an OFF state to an ON state at time t1, and are switched from an ON state to an OFF state at time t2. At time t1 and time t2, although the potential Vel of the power supply varies, initialization, compensation, and data writing are not executed. Thus, it is possible to improve display quality without affecting data writing in the i-th row.

In addition, in the V synchronization duty control, the control circuit 3 executes first processing of specifying a horizontal scanning period during which the light emitting element emits light, among a plurality of horizontal scanning periods constituting one frame period. Further, in the H synchronization duty control, the control circuit 3 executes second processing of specifying a period during which the transistor 124 is in an ON state, within the horizontal scanning period specified by the first processing. On the other hand, in the second processing, a transition timing of the transistor 124 from an OFF state to an ON state and a transition timing of the transistor 124 from an ON state to an OFF state are generated during the transition period.

In addition, in the present embodiment, the control circuit 3 performs switching between the first mode control and the second mode control, according to the average brightness of the entire screen. In the first mode, the transistor 124 transitions to an ON state in the operation period, the transistor 124 is switched from an ON state to an OFF state in the transition period, and then the transistor 124 transitions to an ON state. In the second mode, the transistor 124 transitions to an OFF state in the operation period, the transistor 124 is switched from an OFF state to an ON state in the transition period, and then the transistor 124 transitions to an OFF state. For example, based on the control signal Gel(1) illustrated in FIG. 4, the transistor 124 is in an ON state in the operation period, the transistor 124 transitions from an ON state to an OFF state at time t1, and the transistor 124 transitions again from an OFF state to an ON state at time t2. Thus, this is an example of the first mode. In the first mode, the operation period is assigned for a light-emitting time. Thus, the first mode is suitable for displaying a bright image. In the second mode, the operation period is assigned for a non-light-emitting time. Thus, the second mode is suitable for displaying a dark image. That is, preferably, the control circuit 3 performs switching between the first mode and the second mode, according to the average brightness of the entire screen. Therefore, even when the transition period is half the time of one horizontal scanning period (1H), it is possible to adjust the average brightness between 0% and 100%.

As described above, the condition for determining the adjustment range of the V synchronization duty control and the resolution (the number of the scanning lines 12), and the condition for determining the adjustment range of the H synchronization duty control and the resolution (the frequency of the clock signal which generates the pulse) are independent from each other, and thus the V synchronization duty control and the H synchronization duty control can be executed in a state being completely independent from each other. The electrooptical device 1 according to the present embodiment is configured to be capable of executing both of the V synchronization duty control and the H synchronization duty control. The reasons are as follows.

As described above, the electrooptical device 1 according to the present embodiment is a micro display that is used to display an image on a head-mounted display. In general, a micro display for displaying an image for a left eye and a micro display for displaying an image for a right eye are respectively provided in the head-mounted display. In the head-mounted display, it is preferable to respectively and independently perform left-right adjustment for equalizing brightness of the images for the left and right eyes and overall adjustment for uniformly brightening or darkening brightness of the images for the left and right eyes. The electrooptical device 1 according to the present embodiment is configured to be able to execute two types of the duty control in order to respectively and independently perform the left-right adjustment and the overall adjustment. For example, the control circuit 3 of the electrooptical device 1 adjusts the average brightness by the V synchronization duty control in a case where an execution of the left-right adjustment is instructed, and adjusts the average brightness by the H synchronization duty control in a case where an execution of the whole adjustment is instructed. In contrast to the present embodiment, the left-right adjustment may be realized by the H synchronization duty control, and the overall adjustment may be realized by the V synchronization duty control.

Among the left-right adjustment and the overall adjustment, especially for the left-right adjustment, it is important to equalize left-right output light, which is output after passing through a path of the display unit (electrooptical device 1), a lens unit, and a light guide unit. For this reason, it is necessary to set left-right brightness in consideration of characteristics of each of these three elements (the display unit, the lens unit, and the light guide unit). With regard to setting of the left-right brightness, the left-right brightness may be determined by measuring the brightness using a measurement device before shipment of the head-mounted display. Alternatively, in a case where a detection element for detecting the left-right output light is provided in the head-mounted display, the left-right brightness may be determined based on a measurement result by the detection element.

According to the present embodiment, in each pixel circuit 110 of the selected row, the light emitting element is not switched from an ON state to an OFF state or from an OFF state to an ON state during the operation period. Therefore, according to the present embodiment, even when the potential of the power supply varies due to the switching of the OLED 130 from an ON state to an OFF state or from an OFF state to an ON state, a deviation in the data voltage is unlikely to occur. Thus, it is possible to prevent occurrence of unevenness due to the deviation in the data voltage. That is, according to the present embodiment, it is possible to suppress the affection of the potential variation due to the light-emitting/non-light-emitting of the light emitting element to which the data signal is supplied, and thus it is possible to improve display quality. How long a time interval can be secured as an adjustment range of the control signal Gel(i) is determined according to a time length of each of the one horizontal scanning period (1H), the initialization period, the compensation period, and the write period. With regard to this, when a time length corresponding to approximately 40% of the time length of one horizontal scanning period (1H) can be secured, the average brightness between 0% and 100% can be secured for the pixel circuits 110.

Second Embodiment

In the first embodiment, in the transition period of one horizontal scanning period (1H), by causing the light emitting element of the selected row to transition from the light-emitting state to the non-light-emitting state or from the non-light-emitting state to the light-emitting state, occurrence of an adverse affection on the data writing of the selected row is prevented, and thus display quality is improved. On the other hand, when all of the light emitting elements of the selected row transition from the light-emitting state to the non-light-emitting state or from the non-light-emitting state to the light-emitting state at the same timing, a large potential variation may occur, and the potential of the power supply may be not restored until the compensation period of the threshold voltage Vth of the selected row is started in the next horizontal scanning period (H). As a result, display quality may be deteriorated.

Therefore, an electrooptical device according to the present embodiment has the same configuration as the electrooptical device 1 according to the first embodiment, except that the plurality of pixel circuits 110 included in the display unit 100 are grouped into a plurality of groups, and that the timings at which the light emitting elements transition from the light-emitting state to the non-light-emitting state or from the non-light-emitting state to the light-emitting state in the transition period are different from each other for each group.

Figure 12:
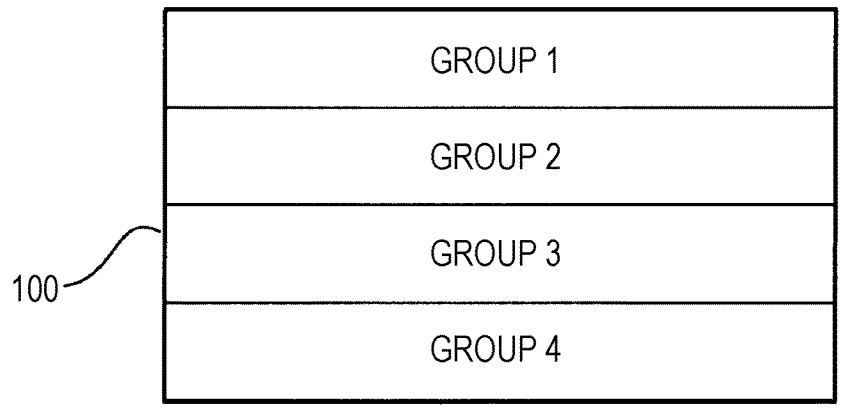
FIG. 12 is a diagram explaining brightness control of the electrooptical device according to a second embodiment of the invention.
Figure 13:
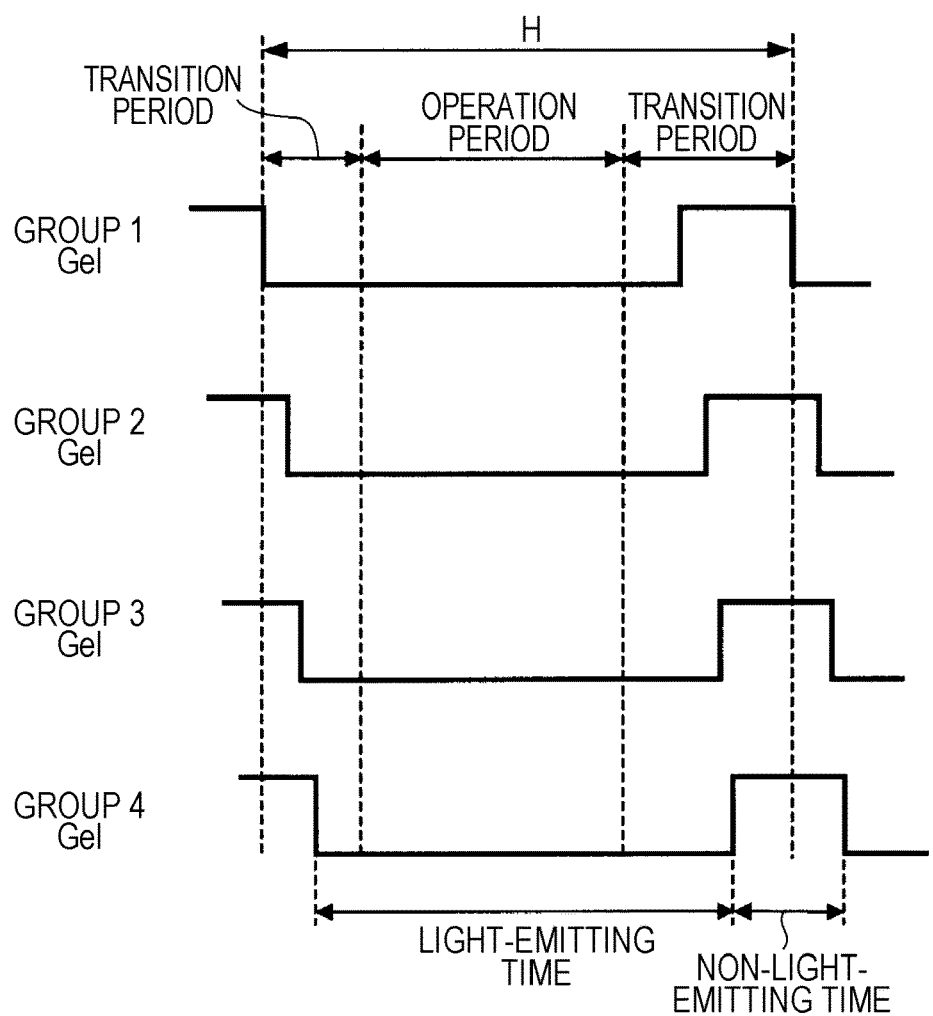
FIG. 13 is a diagram explaining brightness control of the electrooptical device according to the second embodiment of the invention.

FIG. 12 is a diagram illustrating an example of grouping of the pixel circuits 110 according to the present embodiment. As illustrated in FIG. 12, in the present embodiment, the plurality of pixel circuits 110 included in the display unit 100 are grouped into four groups of groups 1 to 4 in the column direction. FIG. 13 is a diagram illustrating an example of rising timings and falling timings of the control signals Gel applied to the pixel circuits 110 belonging to each group. As illustrated in FIG. 13, in the present embodiment, the control signals Gel rise and fall at different timings for each group, and peaks of the potential variation are distributed. Thus, it is possible to prevent deterioration in display quality.

On the other hand, in all of the groups, a ratio between a light-emitting time and a non-light-emitting time is constant. In addition, the transistor 124 transitions between an ON state and an OFF state only in the transition period, and the transition of the transistor 124 is not performed in the operation period.

In the present embodiment, although a case where the plurality of pixel circuits 110 included in the display unit 100 are grouped into four groups is described, the plurality of pixel circuits 110 may be grouped into two or three groups, or five or more groups. In addition, it is not necessary that the pixel circuits 110 belonging to the corresponding group among the groups are contiguously arranged in the column direction. For example, as a mode of grouping the plurality of pixel circuits 110 into two groups, a mode of grouping the plurality of pixel circuits 110 into a group of the pixel circuits 110 connected to the odd-numbered scanning lines 12 and a group of the pixel circuits 110 connected to the even-numbered scanning lines 12, is considered.

Modification Example

The invention is not limited to the above-described embodiments, and for example, various modifications as described below can be made. In addition, among aspects of modification examples to be described below, one or more aspects may be arbitrarily selected and appropriately combined to each other.

Modification Example 1

In the second embodiment described above, a case where the plurality of pixel circuits 110 included in the display unit 100 are grouped into a plurality of groups and the rising timings or the falling timings of the control signals Gel in the transition period are different from each other for each group, is described. On the other hand, when the peaks of the potential variation due to the switching of the light emitting element between the light-emitting state/non-light-emitting state are sufficiently distributed and thus the peaks do not adversely affect the compensation of the threshold voltage Vth and the data writing, it is not necessary that the rising timings or the falling timings of the control signals Gel are limited to the range. In short, as long as the plurality of pixel circuits 110 included in the display unit 100 are grouped into a plurality of groups and the timings at which the light emitting elements belonging to each group transition from an ON state to an OFF state or from an OFF state to an ON state are different from each other for each group, there is no problem.

Modification Example 2

In the embodiments, although the data lines 14 are blocked every three columns and the data signals are supplied to the data lines 14 by sequentially selecting the data lines 14 in each block, the number of the data lines constituting the group may be a predetermined number of "two" or more and "3n" or less. For example, the number of the data lines constituting the group may be "two", or may be "four" or more.

In addition, instead of grouping of the data lines 14, that is, without using the demultiplexer 30, the data signals may be simultaneously supplied to the data lines 14 of each column, in a line-sequential manner.

Modification Example 3

In the embodiments, although P-channel transistors are uniformly used as the transistors 121 to 125, N-channel transistors may be uniformly used as the transistors 121 to 125. In addition, P-channel transistors and N-channel transistors may be used by being appropriately combined with each other.

For example, in a case where N-channel transistors are uniformly used as the transistors 121 to 125, in the embodiments, the data signal Vd(n) having a potential of which the positive polarity and the negative polarity are reversed may be supplied to the pixel circuit 110. In addition, in this case, a connection relationship between the source and the drain of each of the transistors 121 to 125 is reversed as compared with the connection relationship in the embodiments and the modification examples.

Modification Example 4

In the embodiments and the modification examples, although the OLED as a light emitting element is exemplified as an electrooptical element, the electrooptical element may be any light emitting element such as an inorganic light emitting diode or a light emitting diode (LED) as long as the electrooptical element emits light with brightness corresponding to a current.

Modification Example 5

In the embodiments and the modification examples, although the data is written into the pixel circuit 110 by transmitting charges to the pixel circuit 110 using the data transmission circuit 40, the invention is not limited thereto. In addition, although the pixel circuit 110 is configured with five transistors 121 to 125, the invention is not limited thereto, and the transistor 123 and the transistor 125 may be omitted as appropriate. That is, the pixel circuit 110 may include the transistor 122 for writing, the transistor 121 for driving, and the transistor 124 for light-emitting control.

Application Example

Next, an electronic apparatus to which the electrooptical device 1 according to the embodiments and application examples is applied, will be described. The electrooptical device 1 is suitable for display with high definition using small-sized pixels. Therefore, as an example of the electronic apparatus, a head-mounted display will be described.

Figure 14:
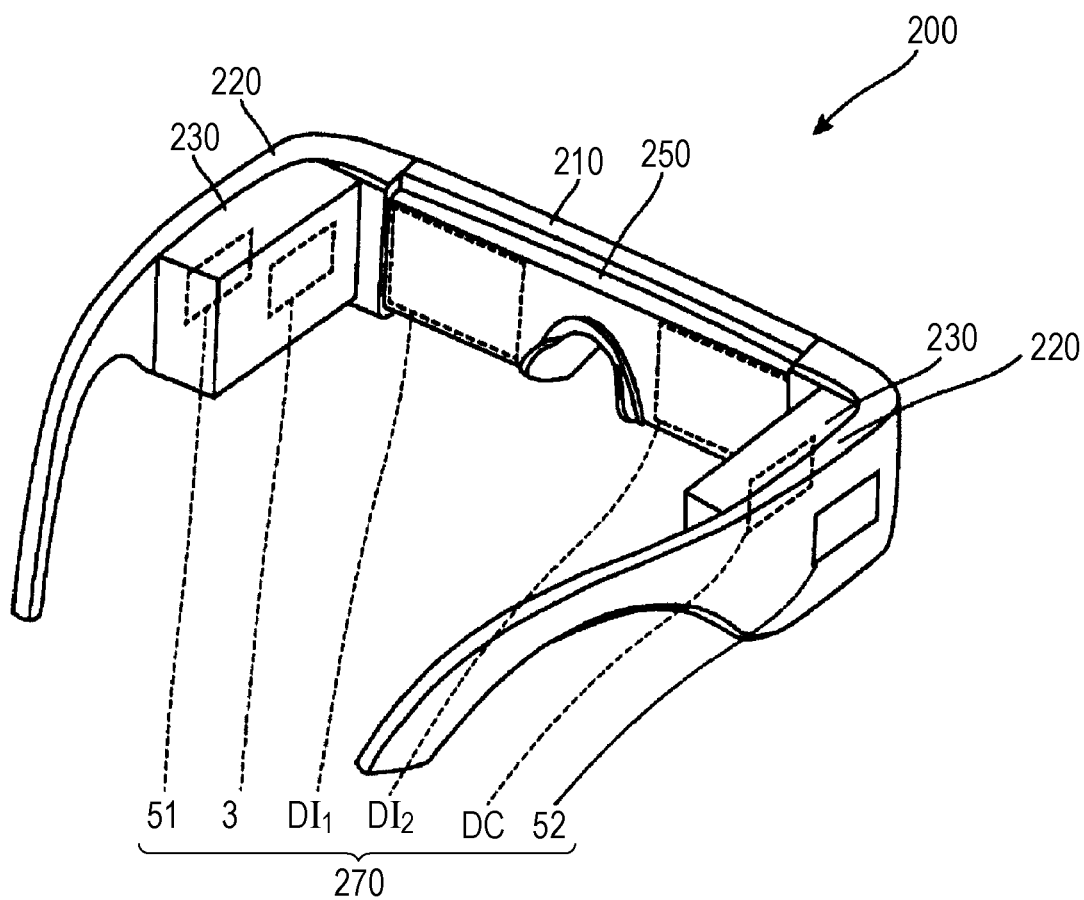
FIG. 14 is a diagram illustrating an appearance configuration of an HMD.

FIG. 14 is a schematic diagram illustrating an aspect in which the electrooptical device according to the invention is applied to a head-mounted display. As illustrated in FIG. 14, a head-mounted display 200 according to the present embodiment includes a front frame 210 which is positioned in front of a head portion of a user, a pair of side frames 220 which are connected to both ends of the front frame 210 and are positioned at both sides of the head portion, an optical panel 250 which is fixed to the front frame 210 and covers user's eyes, circuit covers 230 which are respectively fixed to the side frames 220, and an electrooptical device 270.

In the electrooptical device 270 according to the present embodiment, the number of display panels is two. In addition, the electrooptical device 270 according to the present embodiment has the same configuration as the electrooptical device 1 according to the first embodiment, except that the control circuit 3 includes a brightness balance adjustment input unit 51 and an overall brightness adjustment input unit 52.

One pair of display panels $DI_1$ and $DI_2$ are disposed in the optical panel 250, the display panel $DI_1$ is disposed in front of the left eye, and the display panel $DI_2$ is disposed in front of the right eye. Light emitted from the display panels $DI_1$ and $DI_2$ is emitted from the optical panel 250. The display panel $DI_1$ of one side is visually recognized by the user's left eye, and the display panel $DI_2$ of the other side is visually recognized by the user's right eye.

In addition, in the head-mounted display 200 according to the present embodiment, the brightness balance adjustment input unit 51 is operably provided on the side frame 220 of one side, and the overall brightness adjustment input unit 52 is operably provided on the side frame 220 of the other side. The brightness balance adjustment input unit 51 executes the H synchronization duty control, and the overall brightness adjustment input unit 52 executes the V synchronization duty control. In addition, in the head-mounted display 200 according to the present embodiment, the control circuit 3 is disposed in the circuit cover 230 which is fixed to the side frame 220 of one side, and a power supply circuit DC is disposed in the circuit cover 230 which is fixed to the side frame 220 of the other side. On the other hand, the arrangements may be appropriately changed.

Generally, in the head-mounted display, there is a demand to change brightness of an image visually recognized by a user. In response to such a demand, the head-mounted display 200 according to the present embodiment can change brightness of an image, by changing the overall brightness of the electrooptical device 2 as in the description of the first embodiment. In addition, in a case where the display panels $DI_1$ and $DI_2$ are paired, and where the display panel $DI_1$ of one side is visually recognized by one eye of a person and the display panel $DI_2$ of the other side is visually recognized by the other eye of the person, when brightness of the display panel $DI_1$ and brightness of the display panel $DI_2$ are different from each other, the user is likely to feel uncomfortable, and as a result, there is a demand to adjust the brightness of the left and right display panels $DI_1$ and $DI_2$. In response to such a demand, the head-mounted display 200 according to the present embodiment can adjust a brightness balance between the left and right display panels $DI_1$ and $DI_2$ of the electrooptical device 270, as in the description of the first embodiment. Therefore, it is possible to independently perform change of brightness of an image and adjustment of a brightness balance between the left and right display panels $DI_1$ and $DI_2$.

Figure 15:
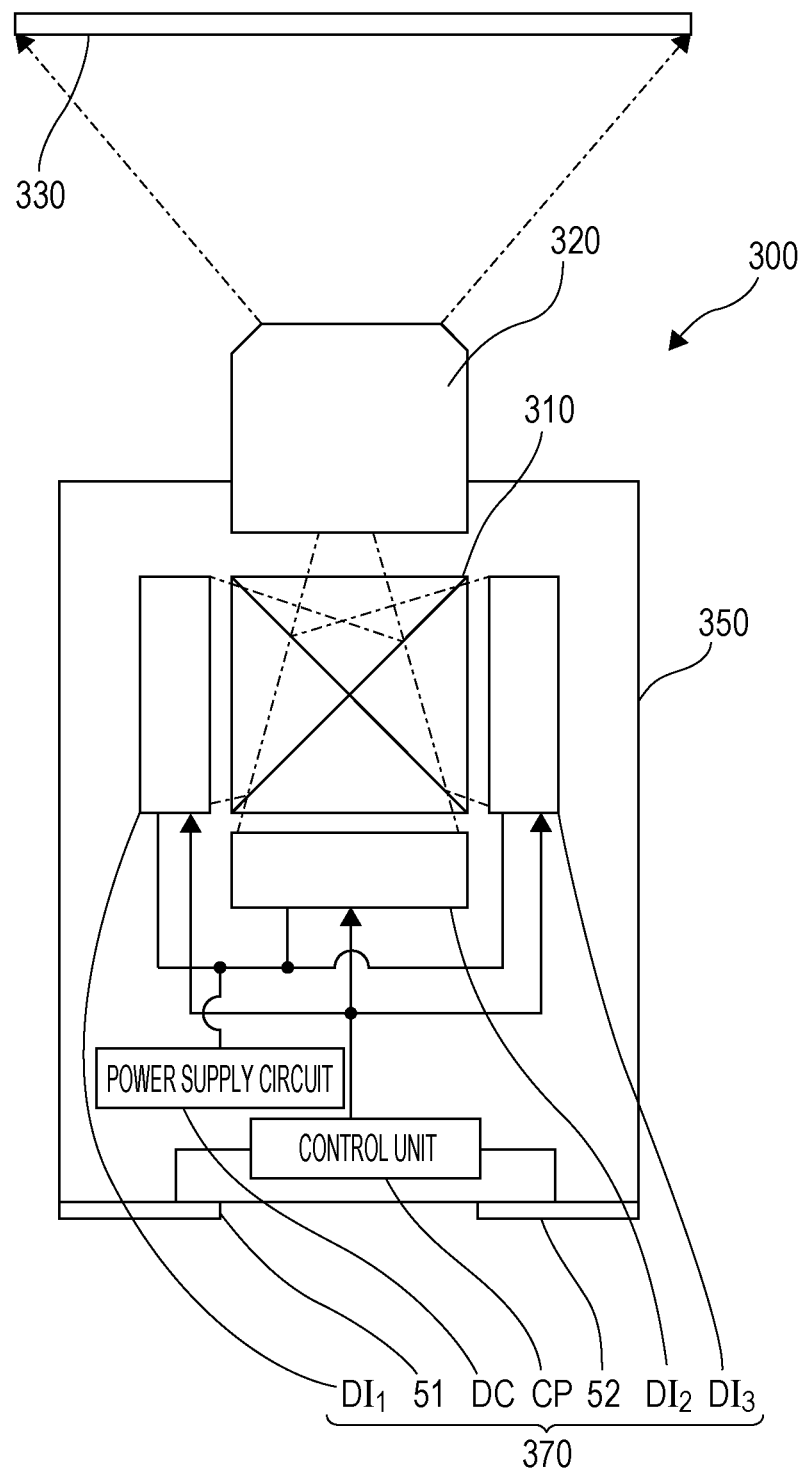
FIG. 15 is a diagram illustrating an optical configuration of the HMD.

FIG. 15 is a schematic diagram illustrating an aspect in which the electrooptical device according to the invention is applied to a projector. As illustrated in FIG. 15, the projector 300 includes a housing 350, an electrooptical device 370, a dichroic prism 310, and a projection lens 320.

In the electrooptical device 370 according to the present embodiment, the number of display panels is three. In addition, the electrooptical device 370 according to the present embodiment has the same configuration as the electrooptical device 1 according to the first embodiment, except that the control circuit 3 includes a brightness balance adjustment input unit 51 and an overall brightness adjustment input unit 52.

Each of the display panels $DI_1$, $DI_2$, and $DI_3$ is disposed in the housing 350, and each pixel array PA of the display panels $DI_1$, $DI_2$, and $DI_3$ includes single-color pixels P. In the present embodiment, the display panel $DI_1$ displays a red image, the display panel $DI_2$ displays a green image, and the display panel $DI_3$ displays a blue image. In addition, the display panels $DI_1$, $DI_2$, and $DI_3$ are respectively disposed such that an angle between light emission directions of the adjacent display panels is approximately 90 degrees. In the present embodiment, the display panel $DI_1$ and the display panel $DI_2$ are adjacent to each other, the display panel $DI_2$ and the display panel $DI_3$ are adjacent to each other, and the display panel $DI_1$ and the display panel $DI_3$ are disposed so as to face each other.

The dichroic prism 310 is disposed at a position surrounded by each of the display panels $DI_1$, $DI_2$, and $DI_3$, and each of the display panels $DI_1$, $DI_2$, and $DI_3$ faces a light incident surface which is a side surface of the dichroic prism 310. In addition, the projection lens 320 is disposed on a light emission surface side of the dichroic prism 310, and thus light in the housing 350 can be emitted to the outside of the housing 350 via the projection lens 320. The projection lens 320 may be configured with one lens or a plurality of lenses.

The brightness balance adjustment input unit 51 and the overall brightness adjustment input unit 52 are operably provided at the outside of the housing 350. When using the projector 300, red light emitted from the display panel $DI_1$, green light emitted from the display panel $DI_2$, and blue light emitted from the display panel $DI_3$ are overlapped with each other, and thus a color image obtained by overlapping the red image, the green image, and the blue image is displayed on the screen 330. The screen 330 may be a light transmission type screen or a light reflection type screen.

When using the projector 300, there is a demand to change brightness of light emitted from the projector 300 according to brightness of a room in which the projector 300 is used. In response to the demand, the projector 300 according to the present embodiment can change brightness of light emitted from the projector 300, by changing the overall brightness of the electrooptical device 370 as in the description of the first embodiment. In addition, in display of a color image as in the projector 300 according to the present embodiment, there is a demand to adjust a white balance. In response to the demand, the projector 300 according to the present embodiment can adjust a brightness balance between red, green, and blue, and adjust a white balance, by adjusting a brightness balance between the three display panels $DI_1$, $DI_2$, and $DI_3$ of the electrooptical device 370 as in the description of the first embodiment. Therefore, it is possible to independently perform change of brightness of light emitted from the projector 300 and adjustment of a white balance.

In the present embodiment, the display panels $DI_1$, $DI_2$, and $DI_3$ are not limited to those that emit light of only specific colors of red, green, and blue as described above, and may be those that emit light of other colors.

In addition, in the embodiments, although a case where the display panels $DI_1$, $DI_2$, and $DI_3$ respectively display images of red, green, and blue is described, the display panels $DI_1$, $DI_2$, and $DI_3$ may not display images, and may be red, green and blue light sources, respectively. In this case, a liquid crystal panel or the like may be disposed in front of each of the display panels $DI_1$, $DI_2$, and $DI_3$, and the liquid crystal panel may display an image based on light emitted from each of the display panels $DI_1$, $DI_2$, and $DI_3$.

In addition to the head-mounted display 200, the electrooptical device 1 may be applied to an electronic view finder such as a video camera or a lens interchangeable type digital camera, a portable information terminal such as a tablet terminal, a wrist watch, or an information display unit of a projector. In addition, in the embodiments, although an example in which the invention is applied to the left-right adjustment in the head-mounted display is described, the invention may be applied to the overall adjustment by realizing the overall adjustment using the H synchronization duty control. In addition, for example, the invention may be applied to "each panel adjustment" (adjustment of brightness of each panel) or "overall adjustment" (adjustment of overall brightness of three panels), in a three-panel projector which performs display by synthesizing images of three panels. For example, "overall adjustment" is realized by V synchronization duty control while "each panel adjustment" is realized by H synchronization duty control, and the invention is applied to the H synchronization duty control. Further, the invention may also be applied to "individual variation adjustment" or "adjustment of brightness when using a product", in an electronic apparatus including only one electrooptical device 1. For example, "adjustment of brightness when using a product" is realized by V synchronization duty control while "individual variation adjustment" is realized by H synchronization duty control, and the invention is applied to the H synchronization duty control.

The entire disclosure of Japanese Patent Application No. 2016-222559, filed Nov. 15, 2016 is expressly incorporated by reference herein.

What is claimed is:

1. An electrooptical device comprising:
 a plurality of pixels that are disposed corresponding to each of intersection positions at which a plurality of scanning lines and a plurality of data lines intersect with each other, and each of which includes a light emitting element which emits light by a driving current; and
 a control circuit that performs a control such that the light emitting element emits light or does not emit light,
 wherein:
  a horizontal scanning period is a period from selection of one scanning line of the plurality of scanning lines until selection of the next scanning line;
  an operation period is a period related to data writing into each pixel corresponding to the selected scanning line;
  a transition period is a period obtained by excluding the operation period from the horizontal scanning period;
  the control circuit controls a ratio between a light-emitting time during which the light emitting element emits light and a non-light-emitting time during which the light emitting element does not emit light, in the horizontal scanning period;

the control circuit causes the light emitting element of each pixel corresponding to the unselected scanning line to transition between the light-emitting state and the non-light-emitting state during the transition period; and the control circuit causes the light emitting element of each pixel corresponding to the unselected scanning line not to transition between the light-emitting state and the non-light-emitting state during the operation period.

2. The electrooptical device according to claim 1, wherein each of the plurality of pixels includes a switching element provided in a current path of a driving current which is supplied to the light emitting element, wherein the control circuit causes the switching element to transition an ON state in a case where the light emitting element is to emit light, and causes the switching element to transition an OFF state in a case where the light emitting element is not to emit light, wherein the control circuit causes the switching element of each pixel to transition between an ON state and an OFF state in the transition period in a case where the light emitting element of each pixel corresponding to the unselected scanning line is to transition between the light-emitting state and the non-light-emitting state; and wherein the control circuit causes the switching element of each pixel to not transition between an ON state and an OFF state in the operation period in a case where the light emitting element of each pixel corresponding to the unselected scanning line is to transition between the light-emitting state and the non-light-emitting state.

3. The electrooptical device according to claim 2, wherein the control circuit performs switching between a first mode and a second mode according to average brightness of the entire screen, the first mode being a mode in which the switching element transitions to an ON state in the operation period, in which the switching element is switched from an ON state to an OFF state in the transition period, and in which the switching element returns again to an ON state, and the second mode being a mode in which the switching element transitions to an OFF state in the operation period, in which the switching element is switched from an OFF state to an ON state in the transition period, and in which the switching element returns again to an OFF state.

4. The electrooptical device according to claim 2, wherein the control circuit executes first processing of specifying a horizontal scanning period during which the light emitting element emits light, among a plurality of horizontal scanning periods constituting one frame period, and second processing of specifying a period during which the switching element is in an ON state in the horizontal scanning period specified by the first processing, and wherein, in the second processing, the control circuit generates a timing at which the switching element transitions from an OFF state to an ON state and a timing at which the switching element transitions from an ON state to an OFF state during the transition period.

5. An electrooptical device comprising:
a plurality of pixels that are disposed corresponding to each of intersection positions at which a plurality of scanning lines and a plurality of data lines intersect with each other, and each of which includes a light emitting element which emits light by a driving current and a switching element provided in a current path for supplying the driving current to the light emitting element; and a control circuit that controls a ratio between a light-emitting time during which the light emitting element emits light and a non-light-emitting time during which the light emitting element does not emit light in a horizontal scanning period, wherein:
a horizontal scanning period is a period from selection of one scanning line of the plurality of scanning lines until selection of the next scanning line;

an operation period is a period related to data writing into each pixel corresponding to the selected scanning line;

a transition period is a period obtained by excluding the operation period from the horizontal scanning period;

the control circuit performs a control such that the timings at which the switching element transitions between an ON state and an OFF state in the transition period are different from each other for each group in which the plurality of pixels are grouped into a plurality of groups; and the control circuit performs a control in which the switching element does not transition between the ON state and the OFF state in the operation period.

6. An electronic apparatus comprising:
the electrooptical device according to claim 1.

7. An electronic apparatus comprising:
electrooptical device according to claim 2.

8. An electronic apparatus comprising:
electrooptical device according to claim 3.

9. An electronic apparatus comprising:
electrooptical device according to claim 4.

10. An electronic apparatus comprising:
electrooptical device according to claim 5.

11. A driving method of an electrooptical device including a plurality of pixels that are disposed corresponding to each of intersection positions at which a plurality of scanning lines and a plurality of data lines intersect with each other and each of which includes a light emitting element which emits light by a driving current, the method comprising:
controlling the light emitting element such that the light emitting element emits light or does not emit light, wherein:
a horizontal scanning period is a period from selection of one scanning line of the plurality of scanning lines until selection of the next scanning line;

an operation period is a period related to data writing into each pixel corresponding to the selected scanning line;

a transition period is a period obtained by excluding the operation period from the horizontal scanning period;

controlling a ratio between a light-emitting time during which the light emitting element emits light and a non-light-emitting time during which the light emitting element does not emit light, in the horizontal scanning period;

causing the light emitting element of each pixel corresponding to the unselected scanning line to transition between the light-emitting state and the non-light-emitting state during the transition period; and causing the light emitting element of each pixel corresponding to the unselected scanning line not to transition between the light-emitting state and the non-light-emitting state during the operation period.

* * * * *